US012744307B2

(12) United States Patent
Pan et al.

(10) Patent No.: US 12,744,307 B2
(45) Date of Patent: Sep. 22, 2026

(54) BASE STATION ANTENNA AND BASE STATION

(71) Applicant: HUAWEI TECHNOLOGIES CO., LTD., Shenzhen (CN)

(72) Inventors: Lijun Pan, Dongguan (CN); Shangshu Xiong, Dongguan (CN); Kun Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 18/928,947

(22) Filed: Oct. 28, 2024

(65) Prior Publication Data

US 2025/0055178 A1 Feb. 13, 2025

Related U.S. Application Data

(63) Continuation of application No. PCT/CN2023/090357, filed on Apr. 24, 2023.

(30) Foreign Application Priority Data

Apr. 29, 2022 (CN) ......................... 202210466325.3

(51) Int. Cl.
*H01Q 1/24* (2006.01)
*H01Q 1/50* (2006.01)
*H01Q 9/28* (2006.01)

(52) U.S. Cl.
CPC ............... *H01Q 1/246* (2013.01); *H01Q 1/50* (2013.01); *H01Q 9/28* (2013.01)

(58) Field of Classification Search
CPC ............ H01Q 1/246; H01Q 1/50; H01Q 9/28; H01Q 1/42; H01Q 19/108; H01Q 21/26
See application file for complete search history.

(56) References Cited

U.S. PATENT DOCUMENTS

2007/0241983 A1 10/2007 Cao et al.

FOREIGN PATENT DOCUMENTS

| | | | | |
|---|---|---|---|---|
| CN | 1496596 A | | 5/2004 | |
| CN | 203134985 U | | 8/2013 | |
| CN | 103915685 A | * | 7/2014 | |
| CN | 104638347 A | | 5/2015 | |
| CN | 111817003 A | * | 10/2020 | ............. H01Q 19/10 |

* cited by examiner

*Primary Examiner* — Dieu Hien T Duong
(74) *Attorney, Agent, or Firm* — Rimon PC

(57) ABSTRACT

This application provides a base station antenna and a base station. The base station antenna includes a first feeder, a second feeder, a first transmission line, a second transmission line, and a radiator. A first end of a first radiation arm is electrically connected to a first end of a second radiation arm through a first wire. A first end of a third radiation arm is electrically connected to a first end of a fourth radiation arm through a second wire. A second end of the first radiation arm is electrically connected to a second end of the third radiation arm through a third wire. A second end of the second radiation arm is electrically connected to a second end of the fourth radiation arm through a fourth wire.

20 Claims, 15 Drawing Sheets

BASE STATION ANTENNA AND BASE STATION

CROSS-REFERENCE TO RELATED APPLICATIONS

This application is a continuation of International Application No. PCT/CN2023/090357, filed on Apr. 24, 2023, which claims priority to Chinese Patent Application No. 202210466325.3, filed on Apr. 29, 2022. The disclosures of the aforementioned applications are hereby incorporated by reference in their entireties.

TECHNICAL FIELD

This application relates to the field of antenna technologies, and in particular, to a base station antenna and a base station including the base station antenna.

BACKGROUND

As a critical part of a wireless network, base station antennas have evolved to meet a plurality of requirements. There is a great demand in the market for a base station antenna suitable for broadband communication, where the base station antenna is required to be compatible with as many communication standards as possible.

To reduce the number of antennas of a single directional base station, two antennas with orthogonal polarization directions of +45° and −45° are generally combined into a dual-polarized antenna. For example, a conventional dual-polarized antenna includes four separately disposed radiators, where a square structure is approximately formed by the four radiators, and ends of two adjacent radiators are spaced apart. One feeder is required for power feeding at the ends of the two adjacent radiators. Therefore, a feeding network of the conventional dual-polarized antenna requires a large number of feeders, so that a structure of the feeding network is complex. Consequently, a structure of the conventional dual-polarized antenna is complex.

SUMMARY

This application provides a base station antenna with a simple structure and a base station.

According to a first aspect, this application provides a base station antenna. The base station antenna includes a feeding network, a first transmission line, a second transmission line, and a radiator. The first transmission line is spaced apart from and crosses the second transmission line. The first transmission line includes a first wire and a second wire that are spaced apart and disposed in parallel. The second transmission line includes a third wire and a fourth wire that are spaced apart and disposed in parallel.

The radiator includes a first radiation arm, a second radiation arm, a third radiation arm, and a fourth radiation arm. A first end of the first radiation arm is electrically connected to a first end of the first wire. A second end of the first radiation arm is electrically connected to a first end of the third wire. A first end of the second radiation arm is electrically connected to a second end of the first wire. A second end of the second radiation arm is electrically connected to a first end of the fourth wire. A first end of the third radiation arm is electrically connected to a first end of the second wire. A second end of the third radiation arm is electrically connected to a second end of the third wire. A first end of the fourth radiation arm is electrically connected to a second end of the second wire. A second end of the fourth radiation arm is electrically connected to a second end of the fourth wire.

The feeding network includes a first feeder and a second feeder. One of a feed end of the first feeder and a ground end of the first feeder is electrically connected to the first wire, and the other is electrically connected to the second wire. One of a feed end of the second feeder and a ground end of the second feeder is electrically connected to the third wire, and the other is electrically connected to the fourth wire.

In some embodiments, the first end of the first radiation arm is electrically connected to the first end of the second radiation arm through the first wire, the first end of the third radiation arm is electrically connected to the first end of the fourth radiation arm through the second wire, the second end of the first radiation arm is electrically connected to the second end of the third radiation arm through the third wire, and the second end of the second radiation arm is electrically connected to the second end of the fourth radiation arm through the fourth wire. In this way, the first transmission line, the second transmission line, the first radiation arm, the second radiation arm, the third radiation arm, and the fourth radiation arm can form a whole. Then, one of the feed end and the ground end of the first feeder is electrically connected to the first wire, and the other is electrically connected to the second wire, to feed power to the first radiation arm, the second radiation arm, the third radiation arm, and the fourth radiation arm through the first feeder, so that the first radiation arm, the second radiation arm, the third radiation arm, and the fourth radiation arm excite two dipoles. One dipole may be excited by the first radiation arm and the third radiation arm. The other dipole may be excited by the second radiation arm and the fourth radiation arm. In this way, the base station antenna can achieve an effect of a binary array antenna. In addition, one of the feed end and the ground end of the second feeder is electrically connected to the third wire, and the other is electrically connected to the fourth wire, to feed power to the first radiation arm, the second radiation arm, the third radiation arm, and the fourth radiation arm through the second feeder, so that the first radiation arm, the second radiation arm, the third radiation arm, and the fourth radiation arm further excite two other dipoles. One dipole may be excited by the first radiation arm and the second radiation arm. The other dipole may be excited by the third radiation arm and the fourth radiation arm. In this way, the base station antenna can further achieve an effect of another binary array antenna. In addition, when power feeding is performed on the first radiation arm, the second radiation arm, the third radiation arm, and the fourth radiation arm through the first feeder and the second feeder, the first radiation arm, the second radiation arm, the third radiation arm, and the fourth radiation arm may generate two types of polarization. In other words, the base station antenna, in some embodiments, may implement a dual-polarization design. A dual-polarized antenna may work in a transmit/receive duplex mode. Therefore, the base station antenna in embodiments of this application may cover a large quantity of bands, to facilitate application of an "interleaving" scenario (namely, a multi-band scenario).

In some embodiments, power feeding is performed on the radiator through one feeder (for example, the first feeder or the second feeder), so that the base station antenna can achieve an effect of a binary array antenna. In addition, power feeding is performed on the radiator through two feeders (for example, the first feeder and the second feeder), so that the base station antenna can implement the dual-polarization design. In embodiments of this application, the base station antenna has a simple structure and low costs.

It should be understood that, compared with a conventional dual-polarized antenna, the base station antenna in embodiments of this application has a lower horizontal plane beam width and a better antenna gain.

In a possible implementation, an angle between the first radiation arm and the first wire toward the second radiation arm is a first angle a1, and the first angle a1 meets 0°<a1≤90°.

It may be understood that 0°<a1≤90° is set, so that the first radiation arm, the second radiation arm, and the first wire can be arranged compactly, thereby reducing space occupied by the first radiation arm, the second radiation arm, and the first wire, and facilitating miniaturization of the base station antenna.

In a possible implementation, the first angle a1 meets 0°<a1≤45°.

In a possible implementation, an angle between the first radiation arm and the third wire toward the second radiation arm is a second angle a2, and the second angle a2 meets 0°<a2≤90°.

It may be understood that 0°<a2≤90° is set, so that the first radiation arm, the second radiation arm, and the third wire can be arranged compactly, thereby reducing space occupied by the first radiation arm, the second radiation arm, and the third wire, and facilitating miniaturization of the base station antenna.

In a possible implementation, the second angle a2 meets 0°<a2≤45°.

In a possible implementation, for a manner of disposing the second radiation arm, the first wire, and the fourth wire, a manner of disposing the third radiation arm, the second wire, and the third wire, and a manner of disposing the fourth radiation arm, the second wire, and fourth wire, refer to a manner of disposing the first radiation arm, the first wire, and the third wire.

In a possible implementation, one of the feed end of the first feeder and the ground end of the first feeder is electrically connected to a middle part of the first wire, and the other is electrically connected to a middle part of the second wire. In other words, when the feed end of the first feeder is electrically connected to the middle part of the first wire, the ground end of the first feeder is electrically connected to the middle part of the second wire. When the feed end of the first feeder is electrically connected to the middle part of the second wire, the ground end of the first feeder is electrically connected to the middle part of the first wire. The following provides descriptions by using an example in which the feed end of the first feeder is electrically connected to the middle part of the first wire, and the ground end of the first feeder is electrically connected to the middle part of the second wire.

It may be understood that a distance from an electrical connection location of the first feeder and the first wire to the first end of the first wire is a first distance. A distance from the electrical connection location of the first feeder and the first wire to the second end of the first wire is a second distance. The feed end of the first feeder is electrically connected to the middle part of the first wire, so that the first distance can be very close to the second distance, thereby improving symmetry of the base station antenna.

Similarly, the ground end of the first feeder is electrically connected to the middle part of the second wire, so that the symmetry of the base station antenna can also be improved.

In a possible implementation, both the first feeder and the second feeder include a coaxial cable, a microstrip, or a balun transmission line.

In a possible implementation, the base station antenna includes a dielectric layer. The dielectric layer includes a first surface and a second surface that are disposed facing away from each other. The first radiation arm, the second radiation arm, the third radiation arm, the fourth radiation arm, the first wire, and the second wire are located on the first surface.

It may be understood that the first radiation arm, the second radiation arm, the third radiation arm, the fourth radiation arm, the first wire, and the second wire are located on the first surface, so that the first radiation arm, the second radiation arm, the third radiation arm, the fourth radiation arm, the first wire, and the second wire can be located on a same plane. The first transmission line and the radiator may be approximately of a planar structure. In this way, compared with a first transmission line and a radiator that are of a three-dimensional structure, the first transmission line and the radiator in embodiments of this application have a simpler structure and occupy less space.

In a possible implementation, the third wire includes a first part, a second part, a third part, a fourth part, and a fifth part that are connected in sequence. An end of the first part away from the second part is the first end of the third wire. An end of the fifth part away from the fourth part is the second end of the third wire. Both the first part and the fifth part are located on the first surface. Both the second part and the fourth part are located between the first surface and the second surface. The third part is located on the second surface.

The second feeder is located on a side of the second surface away from the first surface. The feed end of the second feeder or the ground end of the second feeder is electrically connected to the third part.

It may be understood that, the first part and the fifth part of the third wire are disposed on the first surface, so that a part of the third wire can be located on a same plane as the first radiation arm, the second radiation arm, the third radiation arm, the fourth radiation arm, the first wire, and the second wire, and a part of the third wire, the first transmission line, and the radiator can be approximately of a planar structure. In this way, compared with a third wire, a first transmission line, and a radiator that are of a three-dimensional structure, the third wire, the first transmission line, and the radiator in embodiments of this application have a simpler structure and occupy less space.

In a possible implementation, the dielectric layer is provided with a through hole. The through hole passes through the first surface and the second surface.

The feed end of the first feeder and the ground end of the first feeder extend into the through hole from the side of the second surface away from the first surface. One of the feed end of the first feeder and the ground end of the first feeder is electrically connected to the first wire, and the other is electrically connected to the second wire. An example in which the feed end of the first feeder is electrically connected to the first wire, and the ground end of the first feeder is electrically connected to the second wire is used for description.

It may be understood that, compared with a solution in which the feed end of the first feeder extends from the side of the second surface away from the first surface, bypasses the dielectric layer and the radiator around the dielectric layer, and is electrically connected to the first wire, in embodiments, the dielectric layer is provided with the through hole, so that the feed end of the first feeder can extend into the through hole from the side of the second surface away from the first surface and is electrically connected to the first wire. In this way, the first feeder does not easily interfere with the radiator.

Similarly, when the ground end of the first feeder extends into the through hole from the side of the second surface away from the first surface and is electrically connected to the second wire, the ground end of the first feeder also does not easily interfere with the radiator.

In a possible implementation, the first radiation arm is an integrally formed mechanical part. In this way, the first radiation arm has a simple structure.

In a possible implementation, the second radiation arm, the third radiation arm, and the fourth radiation arm are integrally formed mechanical parts.

In a possible implementation, the base station antenna includes a dielectric layer, and the dielectric layer includes a first surface and a second surface that are disposed facing away from each other. The first radiation arm includes a first radiation section and a second radiation section. The first radiation section includes a first end and a second end. The second radiation section includes a first end and a second end. The first end of the first radiation section is the first end of the first radiation arm. The second end of the second radiation section is the second end of the first radiation arm.

The first radiation section is located on the first surface. The second radiation section is located on the second surface. The second end of the first radiation section is coupled to the first end of the second radiation section.

In a possible implementation, a thickness of the dielectric layer (a distance between the first surface and the second surface of the dielectric layer) is within a range of 0 to 0.1λ. λ is an operating wavelength of the base station antenna. In this way, a coupling effect between the second end of the first radiation section and the first end of the second radiation section is strong.

In a possible implementation, the first wire is located on the first surface, and the first radiation section and the first wire are integrally formed mechanical parts. In this way, steps of producing the first radiation section and the first wire can be reduced, thereby reducing costs of the base station antenna.

In a possible implementation, the first radiation arm, the second radiation arm, the third radiation arm, and the fourth radiation arm are of a centrosymmetric structure. In this way, symmetry of the base station antenna is improved.

In a possible implementation, the base station antenna includes a reflection panel. The first transmission line, the second transmission line, and the radiator are located on a side of the reflection panel.

It may be understood that the reflection panel may reflect and aggregate received signals on a reception point. The radiator is usually placed on a side of the reflection panel. This may not only greatly enhance a signal receiving or transmitting capability, but also block and shield an interference signal from a back side of the reflection panel (where the back side of the reflection panel in this application is a side that faces away from the side that is of the reflection panel and on which the radiator is disposed).

In a possible implementation, the base station antenna includes a radome. The feeding network, the first transmission line, the second transmission line, and the radiator are located inside the radome. It may be understood that the radome may protect the feeding network, the first transmission line, the second transmission line, and the radiator.

According to a second aspect, this application provides a base station. The base station includes a radio frequency processing unit and the base station antenna according to the first aspect. The radio frequency processing unit is electrically connected to the base station antenna.

It may be understood that the base station antenna in some embodiments is a dual-polarized antenna. The dual-polarized antenna may work in a transmit/receive duplex mode. Therefore, the base station antenna in embodiments of this application may cover a large quantity of bands, to facilitate application of an "interleaving" scenario (namely, a multi-band scenario). In addition, in embodiments of this application, a small quantity of feeders may be used, so that the radiator generates two types of polarization. Therefore, in embodiments of this application, the base station antenna has a simple structure and low costs.

According to a third aspect, this application provides a base station antenna. The base station antenna includes a feeding network, a first transmission line, and a radiator. The first transmission line includes a first wire and a second wire that are spaced apart and disposed in parallel.

The radiator includes a first radiation section, a third radiation section, a fifth radiation section, and a seventh radiation section. A first end of the first radiation section is electrically connected to a first end of the first wire. A first end of the third radiation section is electrically connected to a second end of the first wire. Both a second end of the first radiation section and a second end of the third radiation section are located on a side of the first wire away from the second wire. A first end of the fifth radiation section is electrically connected to a first end of the second wire. A first end of the seventh radiation section is electrically connected to a second end of the second wire. Both a second end of the fifth radiation section and a second end of the seventh radiation section are located on a side of the second wire away from the first wire.

The feeding network includes a first feeder. One of a feed end of the first feeder and a ground end of the first feeder is electrically connected to the first wire, and the other is electrically connected to the second wire. In other words, when the feed end of the first feeder is electrically connected to the first wire, the ground end of the first feeder is electrically connected to the second wire. When the feed end of the first feeder is electrically connected to the second wire, the ground end of the first feeder is electrically connected to the first wire. An example in which the feed end of the first feeder is electrically connected to the first wire, and the ground end of the first feeder is electrically connected to the second wire is used for description.

In some embodiments, the first end of the first radiation section is electrically connected to the first end of the third radiation section through the first wire, and the first end of the fifth radiation section is electrically connected to the first end of the seventh radiation section through the second wire. In this way, the first radiation section, the third radiation section, and the first wire can form a whole, and the fifth radiation section, the seventh radiation section, and the second wire can form a whole. Then, one of the feed end and the ground end of the first feeder is electrically connected to the first wire, and the other is electrically connected to the second wire, to feed power to the first radiation section, the third radiation section, the fifth radiation section, and the seventh radiation section through the first feeder, so that the first radiation section, the third radiation section, the fifth radiation section, and the seventh radiation section excite two dipoles. One dipole is excited by the first radiation section and the fifth radiation section. The other dipole is excited by the third radiation section and the seventh radiation section. It may be understood that when phases of the two dipoles are the same, the two dipoles can be superposed in a far field, thereby increasing an antenna gain of the base station antenna. In this way, the base station antenna can achieve an effect of a binary array antenna. In addition, when power feeding is performed on the first radiation section, the third radiation section, the fifth radiation section, and the seventh radiation section through the first feeder, the first radiation section, the third radiation section, the fifth radiation section, and the seventh radiation section may generate one type of polarization. The base station antenna in embodiments of this application has a simple feeding structure and low costs.

In a possible implementation, an angle between the first radiation section and the first wire toward the third radiation section is a first angle a1, and the first angle a1 meets $0° < a1 \leq 90°$.

It may be understood that $0° < a1 \leq 90°$ is set, so that the first radiation section, the third radiation section, and the first wire can be arranged compactly, thereby reducing space occupied by the first radiation section, the third radiation section, and the first wire, and facilitating miniaturization of the base station antenna.

In a possible implementation, an angle between the third radiation section and the first wire toward the second radiation section is a third angle b1, and the third angle b1 meets $0° < b1 \leq 90°$.

It may be understood that $0° < b1 \leq 90°$ is set, so that the first radiation section, the third radiation section, and the first wire can be arranged compactly, thereby further reducing space occupied by the first radiation section, the third radiation section, and the first wire, and facilitating miniaturization of the base station antenna.

In a possible implementation, for a manner of disposing the fifth radiation section, the seventh radiation section, and the second wire, refer to a manner of disposing the first radiation section, the third radiation section, and the first wire.

According to a fourth aspect, this application provides a base station. The base station includes a radio frequency processing unit and the base station antenna according to the third aspect. The radio frequency processing unit is electrically connected to the base station antenna.

The base station in embodiments of this application has a simple structure and low costs.

DESCRIPTION OF EMBODIMENTS

Figure 1:
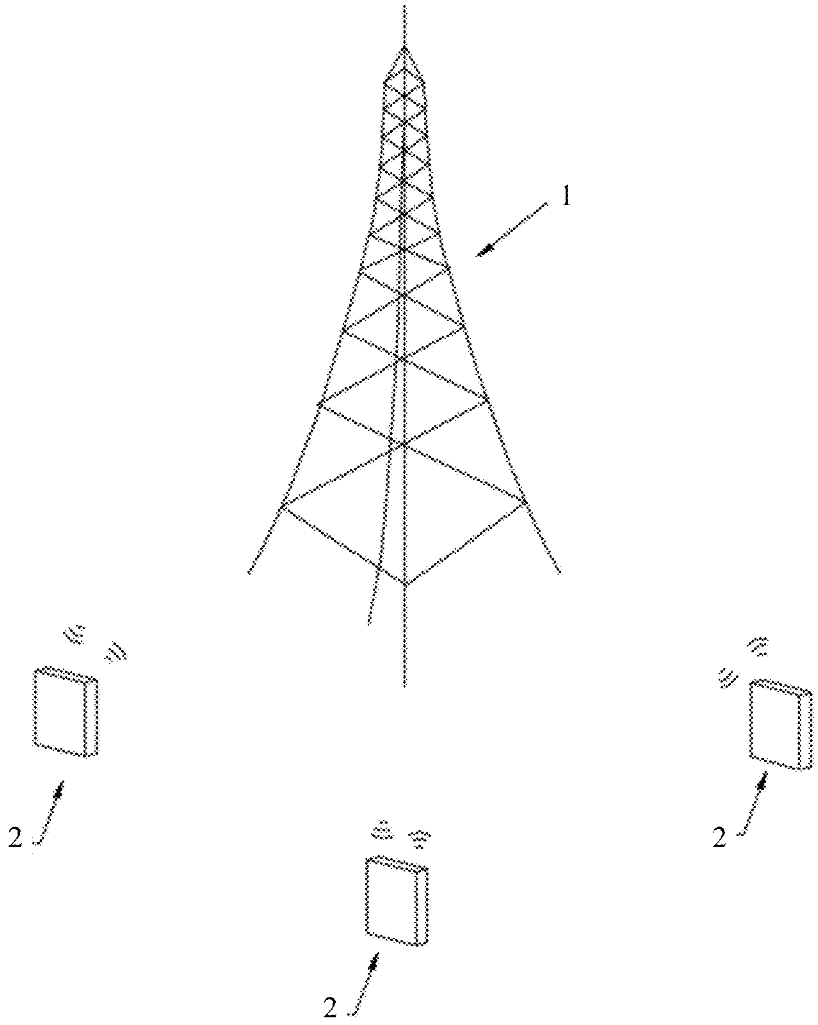
FIG. 1 is a diagram of a system architecture to which an embodiment of this application is applicable.

To facilitate understanding of an antenna structure provided in embodiments of this application, related terms used in this application are explained.

It should be understood that an electrical connection includes a direct connection and a coupled connection. The coupled connection may be a phenomenon that two or more circuit elements or electrical networks closely cooperate with and affect each other in input and output, so that energy is transmitted from one side to another side through interaction. The direct connection may be a form in which components are physically in contact and are electrically connected, or may be a form in which different components in a line structure are connected through a physical line that can transmit electrical signals, for example, a printed circuit board (PCB) copper foil or a wire.

Polarization: a space direction of an electric field vector is a polarization direction of an electromagnetic wave, and the electric field vector is an electric field vector in a direction of maximum radiation of an antenna. If an electric field direction of the electromagnetic wave forms a 45-degree included angle with the ground, this is referred to as 45-degree polarization. If the included angle is positive, this is referred to as +45-degree polarization. If the included angle is negative, this is referred to as −45-degree polarization.

A dipole refers to two charges that are close to each other and have opposite symbols.

A horizontal plane beam width is an angle width of an antenna pattern when power is reduced by 3 dB.

An antenna gain is used to represent a degree to which an antenna intensively radiates input power. Usually, a narrower main lobe of the antenna pattern indicates a smaller minor lobe, and a higher antenna gain.

Transmission line: the transmission line may be considered as a wire used by a system to transmit an electrical signal. In the field of electromagnetics, the term of transmission line is generally used to represent two or more parallel wires that are very close to each other.

The following describes embodiments of this application with reference to the accompanying drawings in embodiments of this application.

In the descriptions of embodiments of this application, "a plurality of" means two or more. In the descriptions of embodiments of this application, a range of A to B includes endpoints A and B. In addition, direction terms mentioned in embodiments of this application, for example, "top", "bottom", and "side surface", are directions with reference to the accompanying drawings. Therefore, the direction terms are used to better and more clearly describe and understand embodiments of this application, and are not used to indicate or imply that an indicated apparatus or element needs to have a direction or be constructed and operated in a direction. Therefore, the direction terms cannot be understood as a limitation on embodiments of this application.

In addition, in embodiments of this application, limitations reciting mathematical concepts, such as, "symmetric", "equal", "45°", "parallel", and "vertical", are not absolute strict definitions in a mathematical sense and do not require exact precision. They may allow a small deviation, and may indicate "approximately symmetric", "approximately equal", "approximately 45°", "approximately parallel", "approximately vertical", and the like. For example, that A is parallel to B means that A is parallel or approximately parallel to B, and an included angle of 0 degrees to 10 degrees between A and B is allowed. For example, that A is vertical to B means that A is vertical or approximately vertical to B, and an included angle of 80 degrees to 100 degrees between A and B is allowed.

FIG. 1 is a diagram of a system architecture to which an embodiment of this application is applicable. As shown in FIG. 1, the system architecture may include a base station 1 and a terminal 2. Wireless communication may be implemented between the base station 1 and the terminal 2. The base station 1 may also be referred to as an access network device, and may be located in a base station subsystem (BBS), a terrestrial radio access network (UTRAN), or an evolved terrestrial radio access network (E-UTRAN), and is configured to perform cell coverage of a signal to implement communication between a terminal device and a wireless network. The base station 1 may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in a long term evolution (LTE) system, or may be a radio controller in a cloud radio access network (CRAN) scenario. Alternatively, the base station 1 may be a relay station, an access point, a vehicle-mounted device, a wearable device, a g node (gNodeB or gNB) in a new radio (NR) system, an access network device in a future evolved network, or the like. This is not limited in embodiments of this application.

Figure 2:
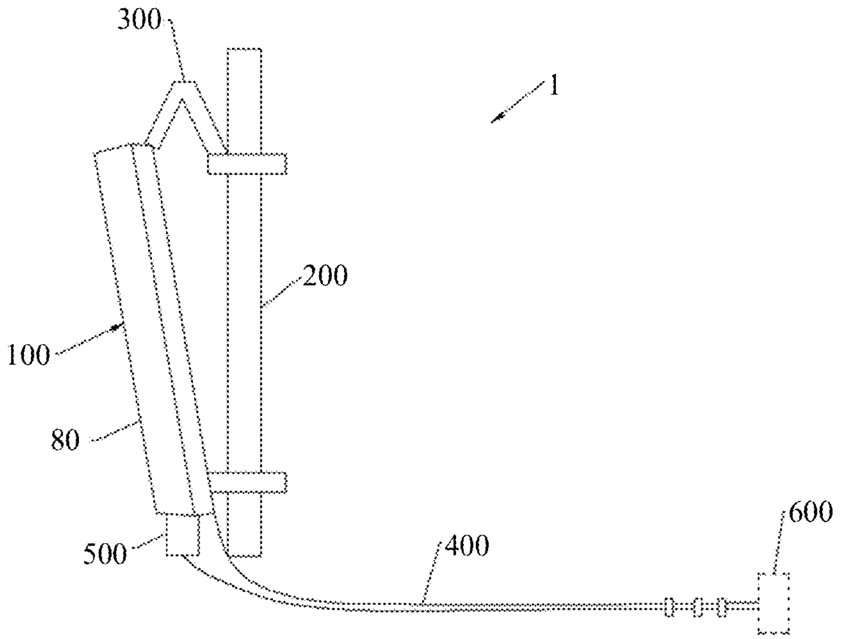
FIG. 2 is a diagram of a structure of a base station according to an embodiment of this application.

The base station 1 is equipped with a base station antenna to implement signal transmission in space. FIG. 2 is a diagram of a structure of a base station 1 according to an embodiment of this application. FIG. 2 shows structures such as a base station antenna 100, a pole 200, and an antenna support 300. The base station antenna 100 includes a radome 80. The radome 80 has a good electromagnetic wave penetration characteristic in terms of electrical performance, and can withstand impact of an external harsh environment in terms of mechanical performance, so that the radome 80 can protect an antenna system from being affected by an external environment. The radome 80 may be installed on the pole 200 or a tower by using the antenna support 300, so that the base station antenna 100 receives or transmits a signal.

In addition, the base station 1 may further include a radio frequency processing unit 500 and a baseband processing unit 600. As shown in FIG. 2, the baseband processing unit 600 may be connected to the base station antenna 100 via the radio frequency processing unit 500. In some embodiments, the radio frequency processing unit 500 may also be referred to as a remote radio unit (RRU), and the baseband processing unit 600 may also be referred to as a baseband unit (BBU).

In a possible embodiment, as shown in FIG. 2, the radio frequency processing unit 500 and the base station antenna 100 may be integrally disposed, and the baseband processing unit 600 is located at a remote end of the base station antenna 100. In this case, the radio frequency processing unit 500 and the base station antenna 100 may be collectively referred to as an active antenna unit (AAU). It should be noted that FIG. 2 is merely an example of a location relationship between the radio frequency processing unit 500 and the base station antenna 100. In some other embodiments, both the radio frequency processing unit 500 and the baseband processing unit 600 may alternatively be located at a remote end of the base station antenna 100. The radio frequency processing unit 500 and the baseband processing unit 600 may be connected through a transmission line 400.

Figure 3:
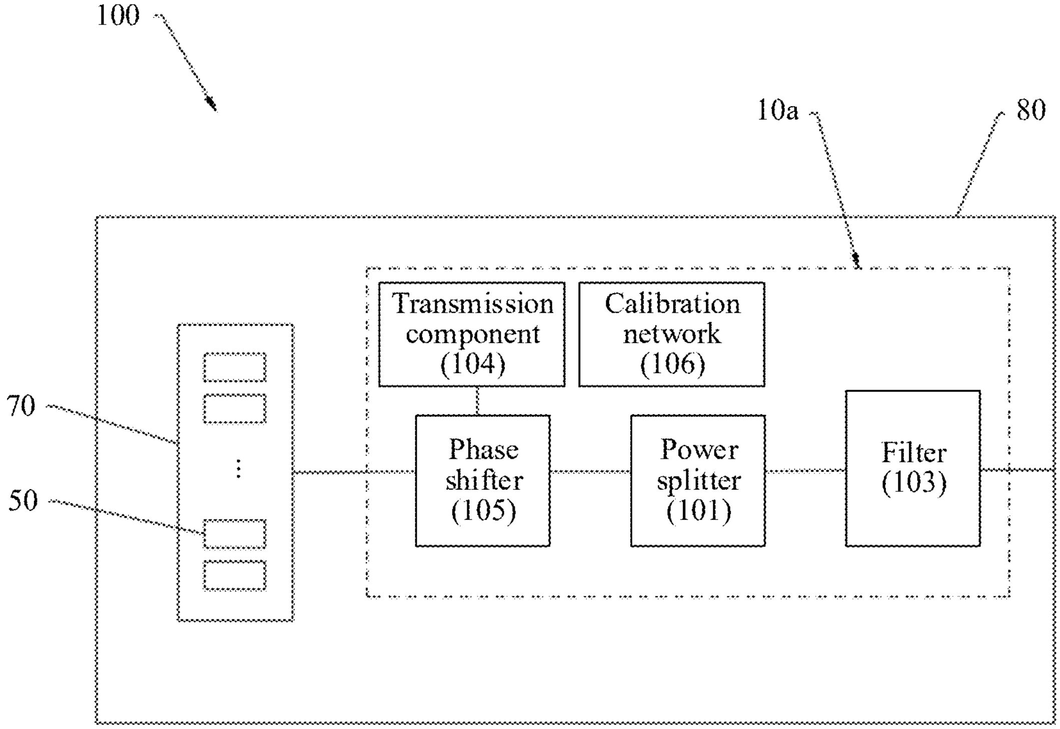
FIG. 3 is a diagram of a structure of a base station antenna according to an embodiment of this application.

Further, FIG. 3 is a diagram of a structure of a base station antenna 100 according to an embodiment of this application. As shown in FIG. 3, the base station antenna 100 may include a radiator 50 and a reflection panel 70. The radiator 50 may also be referred to as an antenna element, an oscillator, or the like. The radiator 50 is a unit that forms a basic structure of an antenna array, and can effectively radiate or receive an antenna signal. Frequencies of different radiators 50 may be the same or different. The reflection panel 70 may also be referred to as a bottom plate, an antenna panel, a metal reflective surface, or the like. The reflection panel 70 may reflect and aggregate received signals on a reception point. The radiator 50 is usually placed on a side of the reflection panel 70. This may not only greatly enhance a signal receiving or transmitting capability, but also block and shield an interference signal from a back side of the reflection panel 70 (where the back side of the reflection panel 70 in this application is a side that faces away from the side that is of the reflection panel 70 and on which the radiator 50 is disposed).

In the base station antenna 100, a feeding network **10*a* may be located between the radiator 50 and a power amplifier of a radio frequency processing unit 500. The feeding network 10*a* may provide power and a phase for the radiator 50. For example, the feeding network 10*a* includes a power divider 101 that can be used in a forward direction or in a reverse direction and that is configured to divide one channel of signal into a plurality of channels of signals or combine the plurality of channels of signals into one channel of signal. The feeding network 10***a* may further include a filter 103, configured to filter out the interference signal. For a remote electrical tilt antenna, the feeding network 10*a* may further include a transmission component 104 to implement different radiation beam directions, and a phase shifter 105 to change a maximum direction of signal radiation. In some cases, the phase shifter 105 further has a function of the power divider 101. In this case, the power divider 101 may be omitted in the feeding network 10*a*. In some embodiments, the feeding network 10*a* may further include a calibration network 106 to obtain a required calibration signal. Different components included in the feeding network 10*a* may be connected to each other through a transmission line and a connector. It should be noted that the power divider 101 may be located inside or outside a radome 80, and connection relationships between different components mentioned above are not unique. FIG. 3 merely shows one possible location relationship and one possible connection manner of the components. In another implementation, the power divider 101 may alternatively be replaced with a combiner in the feeding network 10*a*.

The following describes several implementations of the structure of the base station antenna 100 in detail with reference to related accompanying drawings.

Figure 4:
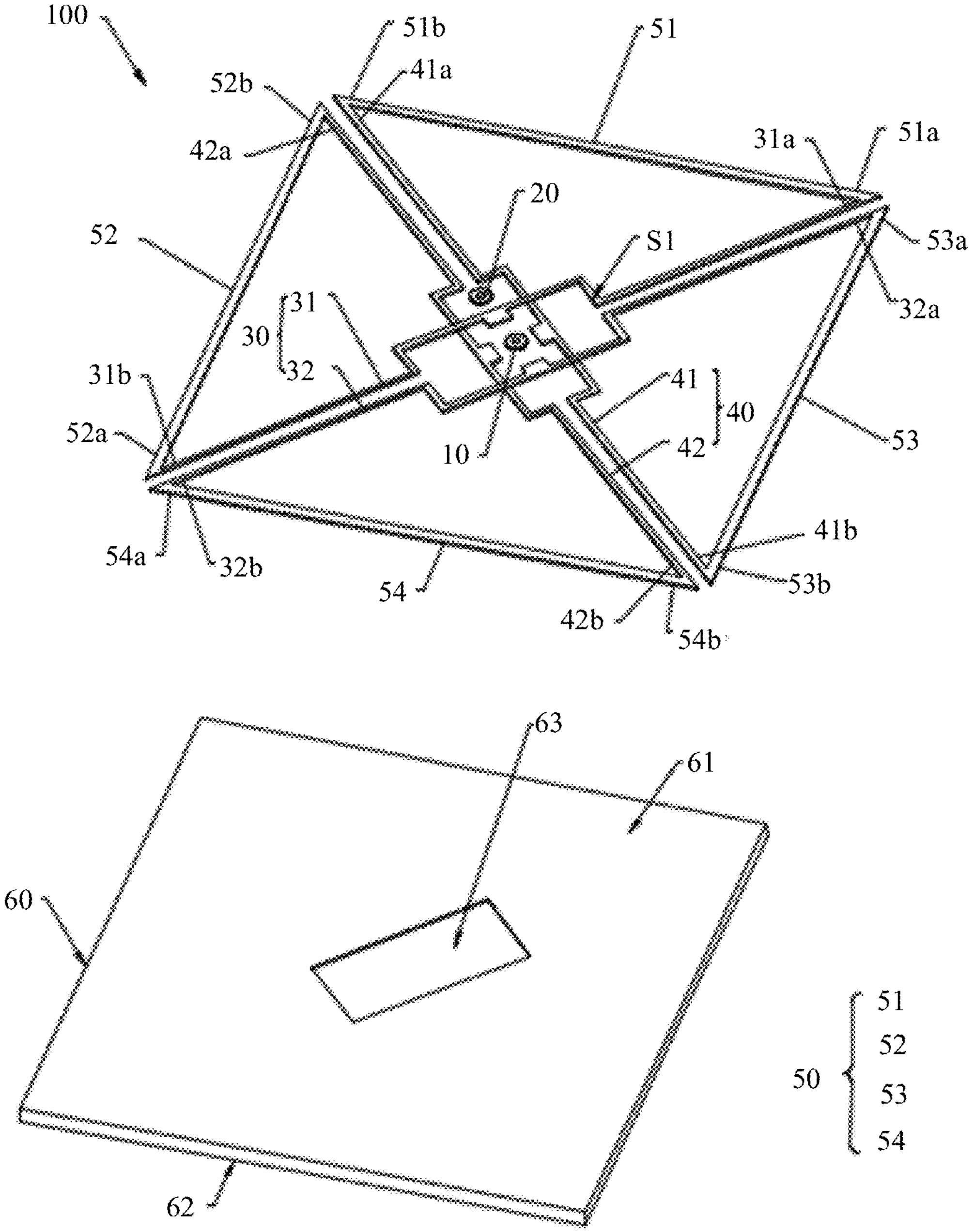
FIG. 4 is a diagram of a structure of a base station antenna according to an embodiment of this application.

FIG. 4 is a diagram of a structure of a base station antenna 100 according to an embodiment of this application. As shown in FIG. 4, the base station antenna 100 includes a dielectric layer 60. The dielectric layer 60 includes a first surface 61 and a second surface 62 that are disposed facing away from each other. For example, the dielectric layer 60 may be made of a Megtron 6 material.

For example, the dielectric layer 60 is provided with a through hole 63, and the through hole 63 passes through the first surface 61 and the second surface 62.

Figure 5:
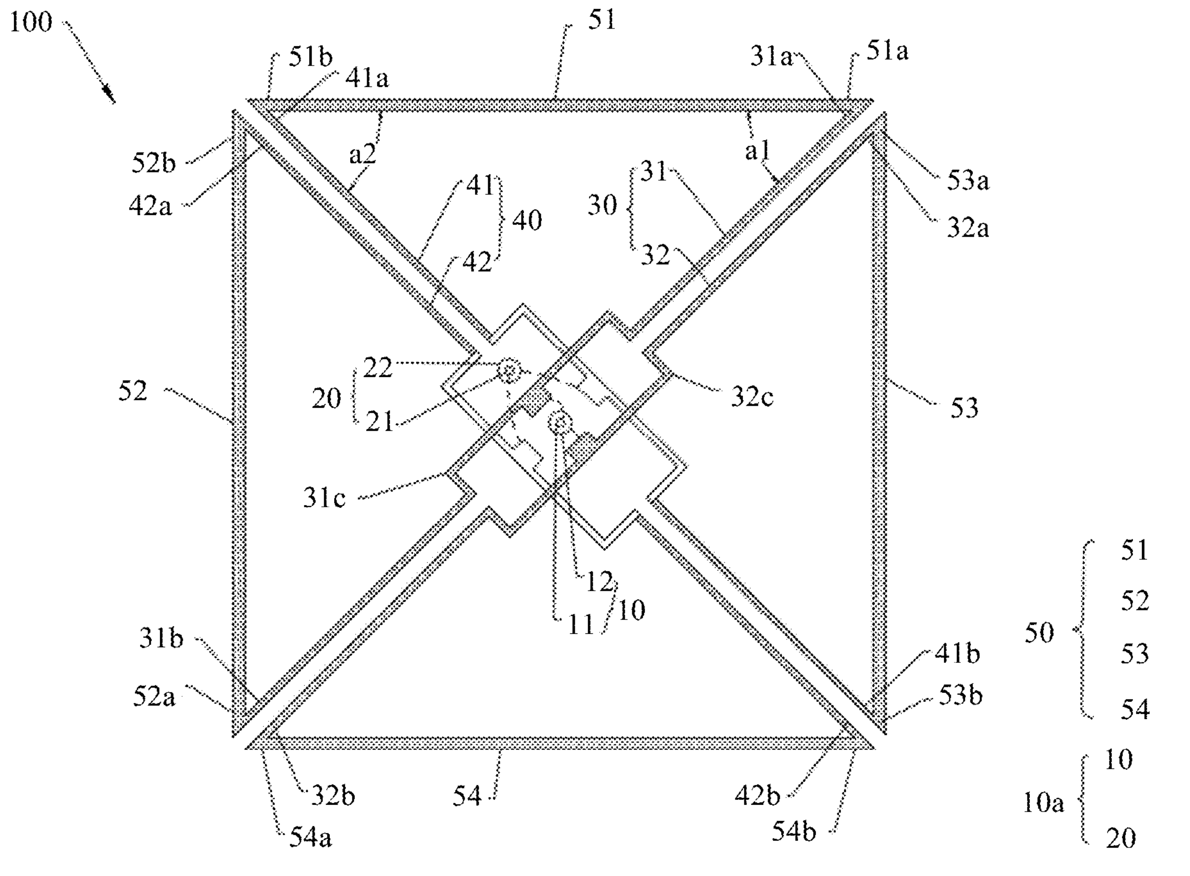
FIG. 5 is a diagram of a structure of a base station antenna according to an embodiment of this application.

FIG. 5 is a diagram of a structure of a base station antenna 100 according to an embodiment of this application. FIG. 5 shows an implementation of a first feeder 10, a second feeder 20, a first transmission line 30, a second transmission line 40, and a radiator 50 shown in FIG. 4. As shown in FIG. 4 and FIG. 5, the radiator 50 includes a first radiation arm 51, a second radiation arm 52, a third radiation arm 53, and a fourth radiation arm 54. The first radiation arm 51 includes a first end 51*a* and a second end 51*b*. The second radiation arm 52 includes a first end 52*a* and a second end 52*b*. The third radiation arm 53 includes a first end 53*a* and a second end 53*b*. The fourth radiation arm 54 includes a first end 54*a* and a second end 54*b*. The first end 51*a* of the first radiation arm 51 may be disposed opposite to the first end 53*a* of the third radiation arm 53. The second end 51*b* of the first radiation arm 51 may be disposed opposite to the second end 52*b* of the second radiation arm 52. The first end 54*a* of the fourth radiation arm 54 may be disposed opposite to the first end 52*a* of the second radiation arm 52. The second end 54*b* of the fourth radiation arm 54 may be disposed opposite to the second end 53*b* of the third radiation arm 53.

It should be understood that in this application, that a component A is disposed opposite to a component B may be that the component A is projected along a target direction to obtain projection C, the component B is projected along a target direction to obtain projection D, and the projection C and the projection D may at least partially overlap. In some embodiments, "at least partially overlap" may be any one of the following cases: the projection C is completely located in the projection D; the projection D is completely located in the projection C; or the projection C and the projection D cross each other.

In some embodiments, the first radiation arm 51, the second radiation arm 52, the third radiation arm 53, and the fourth radiation arm 54 may be in a "strip" shape. A square structure may be approximately enclosed by the first radiation arm 51, the second radiation arm 52, the third radiation arm 53, and the fourth radiation arm 54. In another implementation, the radiator 50 may alternatively be in another shape. The following provides detailed descriptions with reference to related accompanying drawings.

For example, the first radiation arm 51, the second radiation arm 52, the third radiation arm 53, and the fourth radiation arm 54 are of a centrosymmetric structure. In this way, symmetry of the base station antenna 100 is improved.

In some embodiments, the first radiation arm 51, the second radiation arm 52, the third radiation arm 53, and the fourth radiation arm 54 are integrally formed mechanical parts. In another implementation, not all of the first radiation arm 51, the second radiation arm 52, the third radiation arm 53, and the fourth radiation arm 54 may be integrally formed mechanical parts. For example, one, two, or three of the first radiation arm 51, the second radiation arm 52, the third radiation arm 53, and the fourth radiation arm 54 may be an integrally formed mechanical part. However, a radiation arm that is not an integrally formed mechanical part may include a plurality of separate radiation sections. In this application, "a plurality of" may refer to "at least two".

In another implementation, alternatively, none of the first radiation arm 51, the second radiation arm 52, the third radiation arm 53, and the fourth radiation arm 54 may be an integrally formed mechanical part. In this way, each of the first radiation arm 51, the second radiation arm 52, the third radiation arm 53, and the fourth radiation arm 54 includes a plurality of separate radiation sections. The following provides detailed descriptions with reference to related accompanying drawings. Details are not described herein again.

Figure 6:
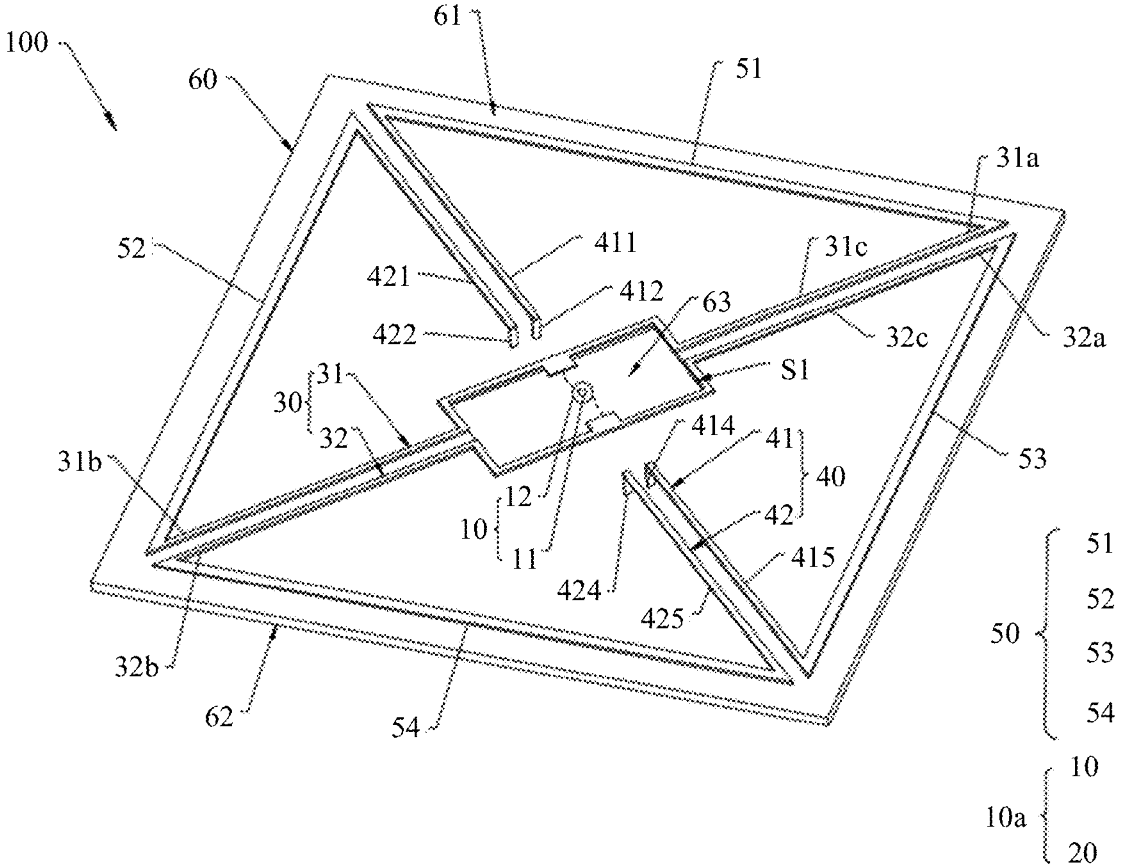
FIG. 6 is a diagram of a structure of a base station antenna according to an embodiment of this application.

FIG. 6 is a diagram of a structure of a base station antenna 100 according to an embodiment of this application. FIG. 6 shows an implementation in which the first feeder 10, the first transmission line 30, a part of the second transmission line 40, and the radiator 50 shown in FIG. 5 cooperate with the dielectric layer 60. It should be understood that FIG. 6 is a diagram of a structure from a perspective of the first surface 61 of the dielectric layer 60. The first radiation arm 51, the second radiation arm 52, the third radiation arm 53, and the fourth radiation arm 54 are disposed on the first surface 61 of the dielectric layer 60. In this way, the radiator 50 may be approximately of a planar structure. Compared with a radiator 50 that is of a three-dimensional structure, the radiator 50 in some embodiments of this application has a simpler structure and occupies less space.

In another implementation, locations of the first radiation arm 51, the second radiation arm 52, the third radiation arm 53, and the fourth radiation arm 54 at the dielectric layer 60 are not limited. For example, alternatively, the first radiation arm 51, the second radiation arm 52, the third radiation arm 53, and the fourth radiation arm 54 may be disposed on the second surface 62 of the dielectric layer 60, or may be embedded in the dielectric layer 60.

As shown in FIG. 4 and FIG. 5, the base station antenna 100 further includes the first transmission line 30 and the second transmission line 40. The first transmission line 30 includes a first wire 31 and a second wire 32 that are spaced apart and disposed in parallel. The second transmission line 40 includes a third wire 41 and a fourth wire 42 that are spaced apart and disposed in parallel.

It should be understood that, that the first wire 31 and the second wire 32 are spaced apart and disposed in parallel includes two cases. In one case, the first wire 31 and the second wire 32 may be disposed in parallel, so that the first wire 31 does not cross the second wire 32, and an extension line of the first wire 31 does not cross an extension line of the second wire 32 either. In another case, the first wire 31 and the second wire 32 may not be disposed in parallel, and the first wire 31 does not cross the second wire 32, but an extension line of the first wire 31 crosses an extension line of the second wire 32 at a remote end. In this way, the first wire 31 is not connected to the second wire 32.

For example, radio-frequency insulation may be performed between the first wire 31 and the second wire 32 in a range of frequencies 300 kHz to 300 GHz.

For a meaning that the third wire 41 and the fourth wire 42 are spaced apart and disposed in parallel, refer to a meaning that the first wire 31 and the second wire 32 are spaced apart and disposed in parallel. Details are not described herein again.

As shown in FIG. 4 and FIG. 5, the first wire 31 includes a first end 31*a* and a second end 31*b*. The second wire 32 includes a first end 32*a* and a second end 32*b*. The first end 31*a* of the first wire 31 may be disposed opposite to the first end 32*a* of the second wire 32. The second end 31*b* of the first wire 31 may be disposed opposite to the second end 32*b* of the second wire 32. In addition, the third wire 41 includes a first end 41*a* and a second end 41*b*. The fourth wire 42 includes a first end 42*a* and a second end 42*b*. The first end 41*a* of the third wire 41 may be disposed opposite to the first end 42*a* of the fourth wire 42. The second end 41*b* of the third wire 41 may be disposed opposite to the second end 42*b* of the fourth wire 42.

As shown in FIG. 4 and FIG. 5, the first transmission line 30 is spaced apart from and crosses the second transmission line 40. In addition, because the first transmission line 30 includes the first wire 31 and the second wire 32 that are spaced apart and disposed in parallel, and the second transmission line 40 includes the third wire 41 and the fourth wire 42 that are spaced apart and disposed in parallel, both the first wire 31 and the second wire 32 are spaced apart from and cross the third wire 41. Both the first wire 31 and the second wire 32 are spaced apart from and cross the fourth wire 42. It should be understood that, that the first wire 31 is spaced apart from the third wire 41 may be that the first wire 31 is separated from the third wire 41, and the first wire 31 is not connected to the third wire 41. In addition, that the first wire 31 crosses the third wire 41 may be that projection of the first wire 31 on a reference plane crosses projection of the third wire 411 on the reference plane. The reference plane may be the first surface 61 or the second surface 62 of the dielectric layer 60. In addition, for a meaning that the second wire 32 is spaced apart from and crosses the third wire 41, a meaning that the first wire 31 is spaced apart from and crosses the fourth wire 42, and a meaning that the second wire 32 is spaced apart from and crosses the fourth wire 42, refer to a meaning that the first wire 31 is spaced apart from and crosses the third wire 41. Details are not described herein again.

As shown in FIG. 4 and FIG. 5, a part of the first wire 31 is recessed in a direction away from the second wire 32. A part of the second wire 32 is recessed in a direction away from the first wire 31. First space S1 may be enclosed by the recessed part of the first wire 31 and the recessed part of the second wire 32. It should be understood that a size of the first space S1 may be changed by changing a recess depth of the first wire 31 and/or a recess depth of the second wire 32. The size may be set flexibly based on a requirement. It should be understood that, in this application, A and/or B may include three cases: A; B; and A and B.

In another implementation, shapes of the first wire 31 and the second wire 32 are not limited. For example, both the first wire 31 and the second wire 32 may alternatively be in a strip shape, and in this case, at least one of the first wire 31 and the second wire 32 may not include the recessed part.

As shown in FIG. 6, both the first wire 31 and the second wire 32 of the first transmission line 30 are disposed on the first surface 61 of the dielectric layer 60. In this way, the first wire 31 and the second wire 32 may be located on a same plane as the first radiation arm 51, the second radiation arm 52, the third radiation arm 53, and the fourth radiation arm 54, and the first transmission line 30 and the radiator 50 may be approximately of a planar structure. In this way, compared with a first transmission line 30 and a radiator 50 that are of a three-dimensional structure, the first transmission line 30 and the radiator 50 in embodiments of this application have a simpler structure and occupy less space.

In addition, the first space S1 is set corresponding to the through hole 63 of the dielectric layer 60. The first space S1 is in communication with the through hole 63.

In another implementation, locations of the first wire 31 and the second wire 32 at the dielectric layer 60 are not limited. For example, the shapes of the first wire 31 and the second wire 32 may be changed, so that a part of the first wire 31 is disposed on the first surface 61 of the dielectric layer 60, a part of the first wire 31 is embedded in the dielectric layer 60, and a part of the first wire 31 is disposed on the second surface 62 of the dielectric layer 60.

Figure 7:
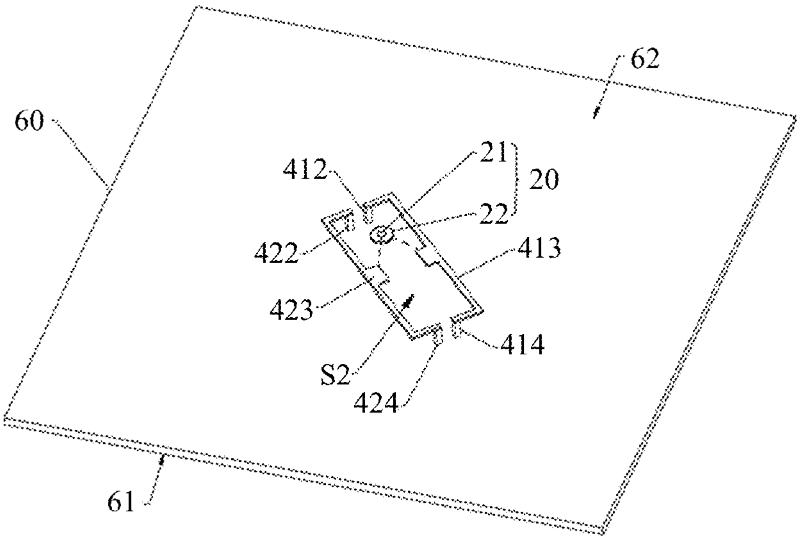
FIG. 7 is a diagram of a structure of the base station antenna shown in FIG. 6 from another perspective.

FIG. 7 is a diagram of a structure of the base station antenna 100 shown in FIG. 6 from another perspective. FIG. 7 shows an implementation in which a part of the second transmission line 40 shown in FIG. 5 cooperates with the dielectric layer 60. It should be understood that FIG. 6 is a diagram of a structure from a perspective of the first surface 61 of the dielectric layer 60. FIG. 7 is a diagram of a structure from a perspective of the second surface 62 of the dielectric layer 60. As shown in FIG. 6 and FIG. 7, the third wire 41 includes a first part 411, a second part 412, a third part 413, a fourth part 414, and a fifth part 415 that are connected in sequence. Both the first part 411 and the fifth part 415 are disposed on the first surface 61 of the dielectric layer 60. The third part 413 is disposed on the second surface 62 of the dielectric layer 60 (and therefore is not shown in FIG. 6). Both the second part 412 and the fourth part 414 are disposed between the first surface 61 and the second surface 62. Both the second part 412 and the fourth part 414 may be embedded in the dielectric layer 60. In this way, the first part 411 and the fifth part 415 are located on a same plane. The first part 411 and the third part 413 are located on different planes. The fifth part 415 and the third part 413 are also located on different planes. It should be understood that the second part 412, the third part 413, and the fourth part 414 may be used as a bridge structure. The first part 411 is connected to the fifth part 415 through the bridge structure. In addition, because the first wire 31 and the second wire 32 of the first transmission line 30 are disposed on the first surface 61 of the dielectric layer 60, and the third part 413 is disposed on the second surface 62 of the dielectric layer 60, the third part 413 of the third wire 41 and the first transmission line 30 are located on different planes. It should be noted that because both the second part 412 and the fourth part 414 are embedded in the dielectric layer 60, FIG. 6 and FIG. 7 schematically show the second part 412 and the fourth part 414 by using dashed lines.

In some embodiments, a part of the third part 413 of the third wire 41 is disposed opposite to the first transmission line 30. A part of the third part 413 may be disposed opposite to the first wire 31, and a part of the third part 413 is disposed opposite to the second wire 32. In addition, the third part 413 of the third wire 41 and the first transmission line 30 are located on different planes. In this way, the third part 413 of the third wire 41 can avoid the first transmission line 30, so that the third wire 41 is spaced apart from and crosses the first transmission line 30, thereby avoiding short-circuiting of the third wire 41 and the first transmission line 30 at a cross location.

In some embodiments, the first part 411 and the fifth part 415 of the third wire 41 are disposed on the first surface 61, so that a part of the third wire 41 can be located on a same plane as the first transmission line 30, the first radiation arm 51, the second radiation arm 52, the third radiation arm 53, and the fourth radiation arm 54, and a part of the third wire 41, the first transmission line 30, and the radiator 50 can be approximately of a planar structure. In this way, compared with a third wire 41, a first transmission line 30, and a radiator 50 that are of a three-dimensional structure, the third wire 41, the first transmission line 30, and the radiator 50 in embodiments of this application have a simpler structure and occupy less space.

In some embodiments, a total length of the first part 411 and the fifth part 415 may be greater than a length of the third part 413. In this way, most of the third wire 41 may be located on a same plane as the first transmission line 30 and the radiator 50, so that a planar structure of the third wire 41, the first transmission line 30, and the radiator 50 is set to a large extent. In another implementation, a total length of the first part 411 and the fifth part 415 is not limited.

As shown in FIG. 6 and FIG. 7, for a manner of disposing the fourth wire 42, refer to a manner of disposing the third wire 41. For example, both a first part 421 and a fifth part 425 of the fourth wire 42 are disposed on the first surface 61 of the dielectric layer 60. The third part 423 of the fourth wire 42 is disposed on the second surface 62 of the dielectric layer 60. Both a second part 422 and a fourth part 424 of the fourth wire 42 are disposed between the first surface 61 and the second surface 62. Both the second part 422 and the fourth part 424 may be embedded in the dielectric layer 60. Details are not described herein again.

In some embodiments, the first wire 31 of the first transmission line 30, the first radiation arm 51, the second radiation arm 52, the first part 411 of the third wire 41, and the first part 421 of the fourth wire 42 are of an integrally formed structure. In this way, steps of preparing the base station antenna 100 may be reduced, thereby reducing costs.

For example, as shown in FIG. 6, the second wire 32 of the first transmission line 30, the third radiation arm 53, the fourth radiation arm 54, the fifth part 415 of the third wire 41, and the fifth part 415 of the fourth wire 42 are of an integrally formed structure.

For example, the first transmission line 30, the second transmission line 40, the radiator 50, and the dielectric layer 60 of the base station antenna 100 may be a part of a circuit board. In this way, the first transmission line 30, the second transmission line 40, and the radiator 50 may be formed through cabling on the circuit board. The dielectric layer 60 may be formed through an insulation layer on the circuit board. In another implementation, the first transmission line 30, the second transmission line 40, the radiator 50, and the dielectric layer 60 of the base station antenna 100 may alternatively be disposed on the circuit board.

In another implementation, the base station antenna 100 may alternatively not include the dielectric layer 60. The first transmission line 30, the second transmission line 40, and the radiator 50 of the base station antenna 100 may be of a pure metal structure, for example, a sheet metal structure.

As shown in FIG. 7, a part of the third part 413 of the third wire 41 is recessed in a direction away from the third part 423 of the fourth wire 42. A part of the third part 423 of the fourth wire 42 is recessed in a direction away from the third part 413 of the third wire 41. Second space S2 may be enclosed by the recessed part of the third wire 41 and the recessed part of the fourth wire 42. It should be understood that a size of the second space S2 may be changed by changing a recess depth of the third wire 41 and/or a recess depth of the fourth wire 42. The size may be set flexibly based on a requirement.

As shown in FIG. 5 and FIG. 6, the first end 51*a* of the first radiation arm 51 is electrically connected to the first end 31*a* of the first wire 31. The second end 51*b* of the first radiation arm 51 is electrically connected to the first end 41*a* of the third wire 41. The first end 52*a* of the second radiation arm 52 is electrically connected to the second end 31*b* of the first wire 31. The second end 52*b* of the second radiation arm 52 is electrically connected to the first end 42*a* of the fourth wire 42. The first end 53*a* of the third radiation arm 53 is electrically connected to the first end 32*a* of the second wire 32. The second end 53*b* of the third radiation arm 53 is electrically connected to the second end 41*b* of the third wire 41. The first end 54*a* of the fourth radiation arm 54 is electrically connected to the second end 32*b* of the second wire 32. The second end 54*b* of the fourth radiation arm 54 is electrically connected to the second end 42*b* of the fourth wire 42.

As shown in FIG. 5, an angle between the first radiation arm 51 and the first wire 31 toward the second radiation arm 52 is a first angle a1. The first angle a1 meets 0°<a≤90°. For example, the first angle a1 is equal to 45°. In this way, the first radiation arm 51 and the first wire 31 are arranged compactly, and the first radiation arm 51 and the first wire 31 occupy small space. In an implementation, the first angle a1 may further meet 0°<a≤45°.

In some embodiments, an angle between the first radiation arm 51 and the third wire 41 toward the third radiation arm 53 is a second angle a2, where 0°<a2≤90°. For example, the second angle a2 is equal to 45°. In this way, the first radiation arm 51 and the third wire 41 are arranged compactly, and the first radiation arm 51 and the third wire 41 occupy small space. In an implementation, the second angle a2 may further meet 0°<a2≤45°.

In another implementation, the first angle a1 may alternatively be greater than 90°. The second angle a2 may alternatively be greater than 90°.

In another implementation, for a manner of disposing the second radiation arm 52, the first wire 31, and the fourth wire 42, a manner of disposing the third radiation arm 53, the second wire 32, and the third wire 41, and a manner of disposing the fourth radiation arm 54, the second wire 32, and the fourth wire 42, refer to a manner of disposing the first radiation arm 51, the first wire 31, and the third wire 41. Details are not described herein again.

As shown in FIG. 4 and FIG. 5, the feeding network 10*a* includes the first feeder 10 and the second feeder 20. The first feeder 10 includes a feed end 11 and a ground end 12 that are spaced apart. The second feeder 20 includes a feed end 21 and a ground end 22 that are spaced apart. The first feeder 10 may be a coaxial cable, a microstrip, or a balun transmission line. The second feeder 20 may be a coaxial cable, a microstrip, or a balun transmission line. For example, the first feeder 10 and the second feeder 20 may be feeders of a same type. For example, both the first feeder 10 and the second feeder 20 are coaxial cables. In this way, the feeding network 10*a* has a small quantity of component types, and a structure of the feeding network 10*a* can be simplified.

In some embodiments, both the first feeder 10 and the second feeder 20 are coaxial cables. It should be noted that FIG. 4 and FIG. 5 merely schematically provide a cross section of the first feeder 10 and a cross section of the second feeder 20. A structure of the first feeder 10 (for example, components, a length, and a shape of the first feeder 10) and a structure of the second feeder 20 (for example, components, a length, and a shape of the second feeder 20) are not described in detail herein.

As shown in FIG. 6 and FIG. 7, both the feed end 11 and the ground end 12 of the first feeder 10 extend into the second space S2, the through hole 63, and the first space S1 from a side of the second surface 62 of the dielectric layer 60 away from the first surface 61. In other words, a part of the first feeder 10 may be located on the side of the second surface 62 of the dielectric layer 60 away from the first surface 61. A part of the first feeder 10 may be located in the second space S2, and a part of the first feeder 10 may be located in the through hole 63 of the dielectric layer 60. A part of the first feeder 10 may be located in the first space S1.

In addition, one of the feed end 11 of the first feeder 10 and the ground end 12 of the first feeder 10 is electrically connected to the first wire 31, and the other is electrically connected to the second wire 32. In other words, when the feed end 11 of the first feeder 10 is electrically connected to the first wire 31, the ground end 12 of the first feeder 10 is electrically connected to the second wire 32. When the feed end 11 of the first feeder 10 is electrically connected to the second wire 32, the ground end 12 of the first feeder 10 is electrically connected to the first wire 31. Here, an example in which the feed end 11 of the first feeder 10 is electrically connected to the first wire 31, and the ground end 12 of the first feeder 10 is electrically connected to the second wire 32 is used for description. It should be noted that in some embodiments, the first feeder 10 is a coaxial cable. In a process in which the feed end 11 of the first feeder 10 is electrically connected to the first wire 31, and the ground end 12 of the first feeder 10 is electrically connected to the second wire 32, protective sleeves at ends of the coaxial cable may be first removed, to expose a part of a feeder and a part of a ground cable of the first feeder 10. Finally, the feeder of the first feeder 10 is welded to the first wire 31, and the ground cable of the first feeder 10 is welded to the second wire 32. Because the protective sleeves are removed from the ends of the first feeder 10, FIG. 5 and FIG. 6 schematically show a connection relationship between the feed end 11 of the first feeder 10 and the first wire 31 and a connection relationship between the ground end 12 of the first feeder 10 and the second wire 32 by using dashed lines.

It may be understood that, in some embodiments, to enable the first feeder 10 located on the side of the second surface 62 of the dielectric layer 60 away from the first surface 61 to be electrically connected to the first wire 31 and the second wire 32 that are disposed on the first surface 61, the second space S2 is set between the third wire 41 and the fourth wire 42, the through hole 63 is provided in the dielectric layer 60, and the first space S1 is set between the first wire 31 and the second wire 32. In this way, the second space S2, the through hole 63, and the first space S1 are used to provide avoidance space for the first feeder 10. In addition, the size of the first space S1, a size of the through hole 63, and the size of the first space S1 may be adjusted to match a size of the first feeder 10.

In another implementation, when there is no second space S2 set between the third wire 41 and the second wire 42, both the feed end 11 and the ground end 12 of the first feeder 10 extend into the through hole 63 and the first space S1 from the side of the second surface 62 of the dielectric layer 60 away from the first surface 61.

In another implementation, when there is no first space S1 set between the first wire 31 and the second wire 32, both the feed end 11 and the ground end 12 of the first feeder 10 extend into the second space S2 and the through hole 63 from the side of the second surface 62 of the dielectric layer 60 away from the first surface 61, and are electrically connected to the first wire 31 and the second wire 32 in the through hole 63.

In another implementation, when there is no first space S1 set between the first wire 31 and the second wire 32, and there is no second space S2 set between the third wire 41 and the second wire 42, both the feed end 11 and the ground end 12 of the first feeder 10 extend into the through hole 63 from the side of the second surface 62 of the dielectric layer 60 away from the first surface 61, and are electrically connected to the first wire 31 and the second wire 32 in the through hole 63.

It may be understood that, compared with a solution in which the feed end of the first feeder extends from the side of the second surface away from the first surface, bypasses the dielectric layer and the radiator around the dielectric layer, and is electrically connected to the first wire, in embodiments of this application, the second space S2 is set between the third wire 41 and the fourth wire 42, the dielectric layer 60 is provided with the through hole 63, and the first space S1 is set between the first wire 31 and the second wire 32, so that the feed end 11 of the first feeder 10 can extend into the second space S2, the through hole 63, and the first space S1 from the side of the second surface 62 of the dielectric layer 60 away from the first surface 61, and is electrically connected to the first wire 31. In this way, the first feeder 10 does not easily interfere with the radiator 50. Similarly, when the ground end 12 of the first feeder 10 extends into the second space S2, the through hole 63, and the first space S1 from the side of the second surface 62 away from the first surface 61, and is electrically connected to the second wire 32, the ground end 12 of the first feeder 10 also does not easily interfere with the radiator 50.

As shown in FIG. 6, the feed end 11 of the first feeder 10 is electrically connected to a middle part 31*c* of the first wire 31, and the ground end 12 of the first feeder 10 is electrically connected to a middle part 32*c* of the second wire 32. The middle part 31*c* of the first wire 31 is connected to the first end 31*a* and the second end 31*b* of the first wire 31. The middle part 32*c* of the second wire 32 is connected to the first end 32*a* and the second end 32*b* of the second wire 32. In this application, the middle part 31*c* of the first wire 31 may be a remaining part of the first wire 31 except the first end 31*a* and the second end 31*b* of the first wire 31. Similarly, for a meaning of the middle part 32*c* of the second wire 32, refer to a meaning of the middle part 31*c* of the first wire 31.

In some embodiments, the feed end 11 of the first feeder 10 is electrically connected to the middle part 31*c* of the first wire 31, and the ground end 12 of the first feeder 10 is electrically connected to the middle part 32*c* of the second wire 32. Therefore, when a signal is transmitted through the first feeder 10, the signal can be simultaneously transmitted to the first radiation arm 51, the second radiation arm 52, a third transmission arm 53, and a fourth transmission arm 54 through the first wire 31 and the second wire 32. Certainly, the signal may alternatively be transmitted from the first radiation arm 51, the second radiation arm 52, the third radiation arm 53, and the fourth radiation arm 54 to the first feeder 10 through the first wire 31 and the second wire 32. It should be understood that, compared with a solution in which two first feeders are disposed, a feed end of one first feeder is electrically connected to a first end of a first radiation arm, a ground end of the first feeder is electrically connected to a first end of a third radiation arm, a feed end of the other first feeder is electrically connected to a first end of a second radiation arm, and a ground end of the other first feeder is electrically connected to the first end of the third radiation arm, in embodiments of this application, one first feeder may be omitted in the base station antenna 100. In this way, the base station antenna 100 in embodiments of this application has a simple structure.

It should be understood that a distance from an electrical connection location of the first feeder 10 and the first wire 31 to the first end 31*a* of the first wire 31 is a first distance. A distance from the electrical connection location of the first feeder 10 and the first wire 31 to the second end 31*b* of the first wire 31 is a second distance. The feed end 11 of the first feeder 10 is electrically connected to the middle part 31*c* of the first wire 31, so that the first distance can be very close to the second distance, thereby improving symmetry of the base station antenna. Similarly, the ground end 12 of the first feeder 10 is electrically connected to the middle part 32*c* of the second wire 32, so that the symmetry of the base station antenna 100 can also be improved.

As shown in FIG. 7, a feed end 21 and a ground end 22 of the second feeder 20 may be located on the side of the second surface 62 of the dielectric layer 60 away from the first surface 61. One of the feed end 21 of the second feeder 20 and the ground end 22 of the second feeder 20 is electrically connected to the third wire 41, and the other is electrically connected to the fourth wire 42. In other words, when the feed end 21 of the second feeder 20 is electrically connected to the third wire 41, the ground end 22 of the second feeder 20 is electrically connected to the fourth wire 42; or when the feed end 21 of the second feeder 20 is electrically connected to the fourth wire 42, the ground end 22 of the second feeder 20 is electrically connected to the third wire 41. An example in which when the feed end 21 of the second feeder 20 is electrically connected to the fourth wire 42, the ground end 22 of the second feeder 20 is electrically connected to the third wire 41 is used for description. It should be noted that FIG. 7 schematically shows a connection relationship between the feed end 21 of the second feeder 20 and the fourth wire 42 and a connection relationship between the ground end 22 of the second feeder 20 and the third wire 41 by using dashed lines.

In some embodiments, the feed end 21 of the second feeder 20 is electrically connected to the third part 423 of the fourth wire 42. The ground end 22 of the second feeder 20 is electrically connected to the third part 413 of the third wire 41. In this way, when the second feeder 20 transmits a signal, the signal can be simultaneously transmitted to the first radiation arm 51, the second radiation arm 52, the third transmission arm 53, and the fourth transmission arm 54 through the third wire 41 and the fourth wire 42. Certainly, the signal may alternatively be transmitted from the first radiation arm 51, the second radiation arm 52, the third transmission arm 53, and the fourth transmission arm 54 to the second feeder 20 through the third wire 41 and the fourth wire 42. It should be understood that, compared with a solution in which two second feeders are disposed, a feed end of one second feeder is electrically connected to a second end of a first radiation arm, a ground end of the second feeder is electrically connected to a second end of a third radiation arm, a feed end of the other first feeder is electrically connected to a second end of a second radiation arm, and a ground end of the other second feeder is electrically connected to the second end of the third radiation arm, in embodiments of this application, one second feeder may be omitted in the base station antenna 100. In this way, the base station antenna 100 in embodiments of this application has a simple structure.

In some embodiments, the base station antenna 100 may generate two types of polarization. The following describes an implementation of currents of the two types of polarization in detail with reference to related accompanying drawings.

Figure 8:
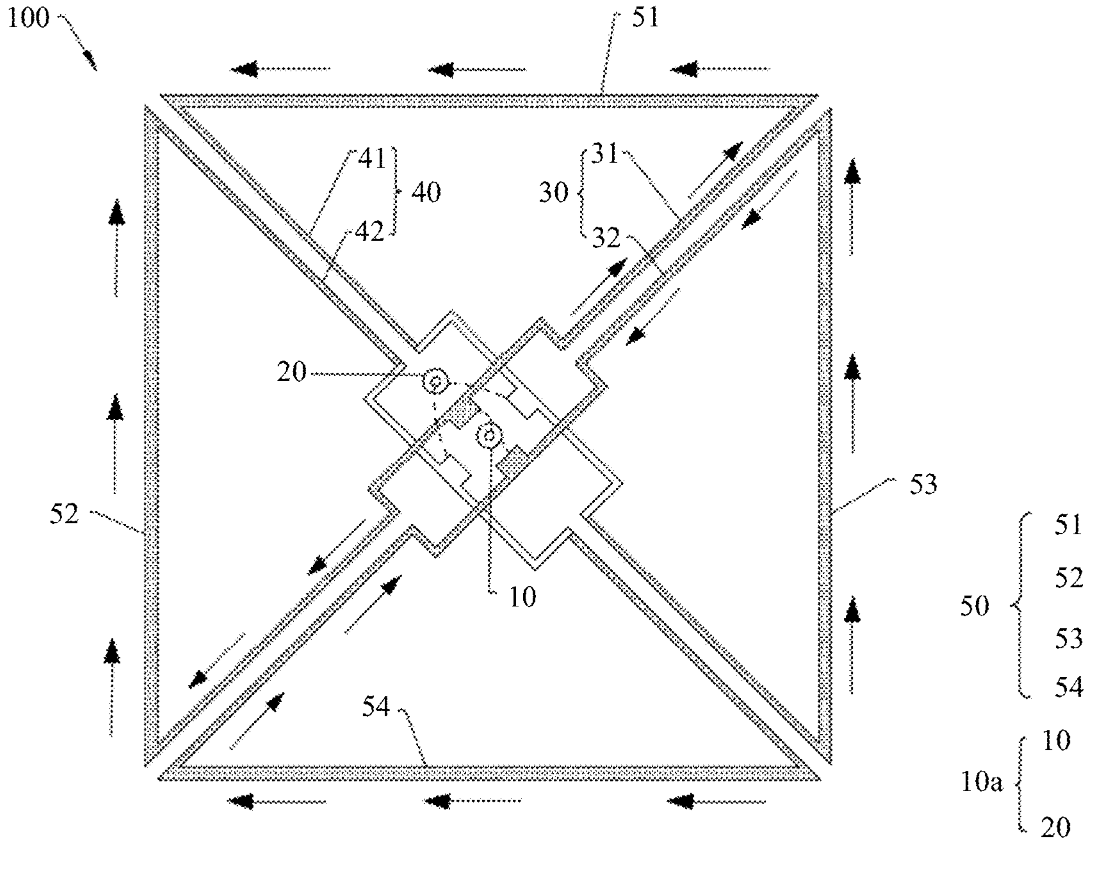
FIG. 8 is a diagram of a first type of polarization of a base station antenna during power feeding according to an embodiment of this application.

FIG. 8 is a diagram of a first type of polarization of a base station antenna 100 during power feeding according to an embodiment of this application. As shown in FIG. 8, a current of the first type of polarization includes four parts. One part is a current transmitted from the first feeder 10 to the first wire 31 and the first radiation arm 51. One part is a current transmitted from the first feeder 10 to the first wire 31 and the second radiation arm 52. One part is a current transmitted from the third radiation arm 53 to the second wire 32 and the first feeder 10. One part is a current transmitted from the fourth radiation arm 54 to the second wire 32 and the first feeder 10.

It should be noted that, in FIG. 8, a solid line with an arrow is used to represent a flow direction of the current. To make the accompanying drawings more concise, the current direction in FIG. 8 is not directly shown on a mechanical part (for example, the first radiation arm 51 or the first wire 31), but is shown around the mechanical part.

In some embodiments, power feeding is performed on the radiator 50 through one first feeder 10, and the radiator 50 may generate one type of polarization. In addition, the radiator 50 may excite two dipoles. One dipole may be excited by the first radiation arm 51 and the third radiation arm 53. The other dipole may be excited by the second radiation arm 52 and the fourth radiation arm 54. It may be understood that when phases of the two dipoles are the same, the two dipoles may be superposed in a far field, thereby increasing an antenna gain of the base station antenna 100. In this way, the base station antenna 100 can achieve an effect of a binary array antenna. The binary array antenna may be an array formed by two antennas.

Figure 9:
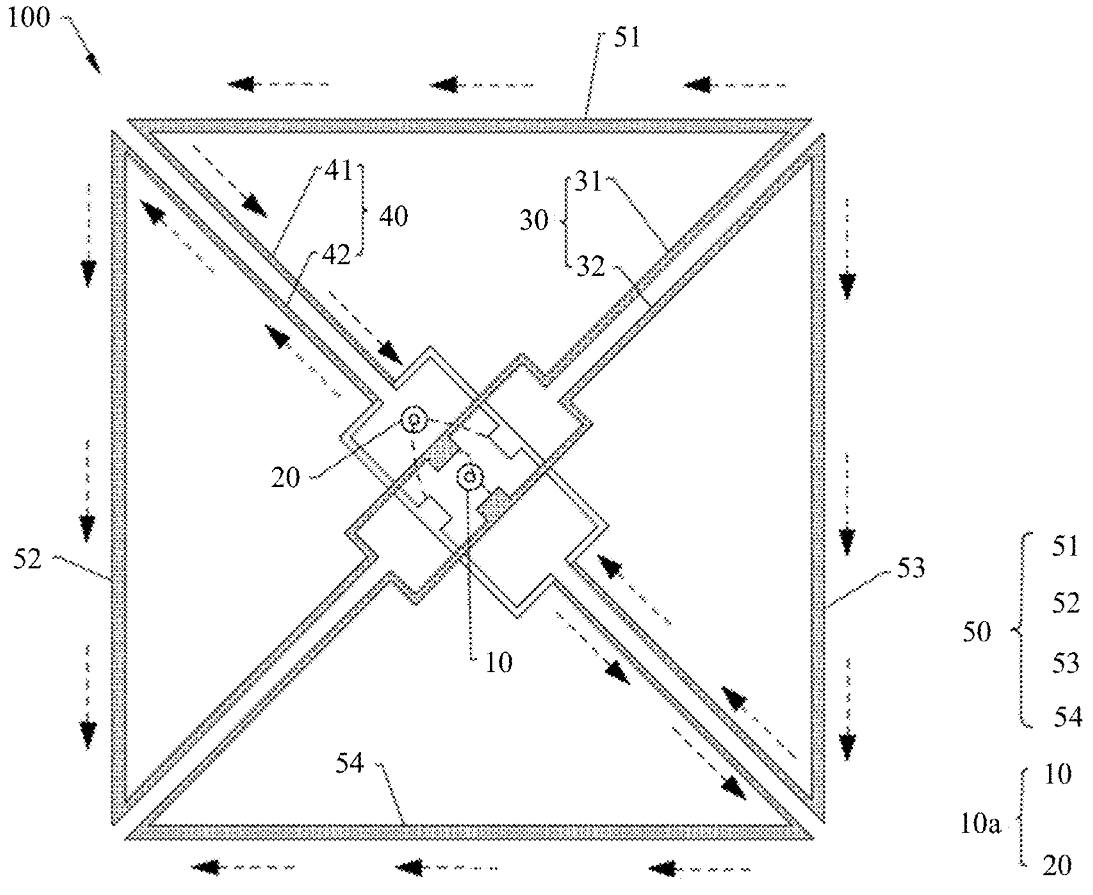
FIG. 9 is a diagram of a second type of polarization of a base station antenna during power feeding according to an embodiment of this application.

FIG. 9 is a diagram of a second type of polarization of a base station antenna 100 during power feeding according to an embodiment of this application. As shown in FIG. 9, a current of the second type of polarization includes four parts. One part is a current transmitted from the first radiation arm 51 to the third wire 41 and the second feeder 20. One part is a current transmitted from the third radiation arm 53 to the third wire 41 and the second feeder 20. One part is a current transmitted from the second feeder 20 to the fourth wire 42 and the second radiation arm 52. One part is a current transmitted from the second feeder 20 to the fourth wire 42 and the fourth radiation arm 54.

It should be noted that, in FIG. 9, a dashed line with an arrow is used to represent a direction of the current. To make the accompanying drawings more concise, the current direction in FIG. 8 is not directly shown on a mechanical part (for example, the first radiation arm 51 or the third wire 41), but is shown around the mechanical part.

In some embodiments, power feeding is performed on the radiator 50 through one second feeder 20, and the radiator 50 may generate the second type of polarization. Furthermore, the radiator 50 may excite two other dipoles. One dipole may be excited by the first radiation arm 51 and the second radiation arm 52. The other dipole may be excited by the third radiation arm 53 and the fourth radiation arm 54. It may be understood that when phases of the two dipoles are the same, the two dipoles may be superposed in a far field, thereby increasing an antenna gain of the base station antenna 100. In this way, the base station antenna 100 can achieve an effect of another binary array antenna.

For example, one of the two types of polarization may be +45° polarization, and the other may be −45° polarization.

It should be understood that, as shown in FIG. 5, in some embodiments, the first end 51*a* of the first radiation arm 51 is electrically connected to the first end 52*a* of the second radiation arm 52 through the first wire 31, the first end 53*a* of the third radiation arm 53 is electrically connected to the first end 54*a* of the fourth radiation arm 54 through the second wire 32, the second end 51*b* of the first radiation arm 51 is electrically connected to the second end 53*b* of the third radiation arm 53 through the third wire 41, and the second end 52*b* of the second radiation arm 52 is electrically connected to the second end 54*b* of the fourth radiation arm 54 through the fourth wire 42. In this way, the first transmission line 30, the second transmission line 40, the first radiation arm 51, the second radiation arm 52, the third radiation arm 53, and the fourth radiation arm 54 can form a whole. Then, one of the feed end 11 and the ground end 12 of the first feeder 10 is electrically connected to the first wire 31, and the other is electrically connected to the second wire 32, to feed power to the first radiation arm 51, the second radiation arm 52, the third radiation arm 53, and the fourth radiation arm 54 through the first feeder 10, so that the first radiation arm 51, the second radiation arm 52, the third radiation arm 53, and the fourth radiation arm 54 excite two dipoles. In this way, the base station antenna 100 can achieve an effect of a binary array antenna. In addition, one of the feed end 21 and the ground end 22 of the second feeder 20 is electrically connected to the third wire 41, and the other is electrically connected to the fourth wire 42, to feed power to the first radiation arm 51, the second radiation arm 52, the third radiation arm 53, and the fourth radiation arm 54 through the second feeder 20, so that the first radiation arm 51, the second radiation arm 52, the third radiation arm 53, and the fourth radiation arm 54 further excite two other dipoles. In this way, the base station antenna 100 can further achieve an effect of another binary array antenna. In addition, when power feeding is performed on the first radiation arm 51, the second radiation arm 52, the third radiation arm 53, and the fourth radiation arm 54 through the first feeder 10 and the second feeder 20, the first radiation arm 51, the second radiation arm 52, the third radiation arm 53, and the fourth radiation arm 54 may generate two types of polarization. In other words, the base station antenna 100 in some embodiments may implement a dual-polarization design. A dual-polarized antenna may work in a transmit/receive duplex mode. Therefore, the base station antenna 100 may cover a large quantity of bands, to facilitate application of an “interleaving” scenario (namely, a multi-band scenario).

In addition, in some embodiments, power feeding is performed on the radiator 50 through one feeder (for example, the first feeder 10 or the second feeder 20), so that the base station antenna 100 can achieve an effect of a binary array antenna. In addition, power feeding may be performed on the radiator 50 through two feeders (for example, the first feeder 10 and the second feeder 20), so that the base station antenna 100 can implement the dual-polarization design. The base station antenna 100 in embodiments of this application has a simple structure and low costs.

It should be understood that, compared with a conventional dual-polarized antenna, the base station antenna 100 in embodiments of this application has a lower horizontal plane beam width and a better antenna gain.

In some embodiments, the base station antenna 100 may support a signal in a low band (for example, a band whose frequency is in a range of 690 MHz to 960 MHz), and the base station antenna 100 may also support working in a high band (for example, a band whose frequency is in a range of 1695 MHz to 2700 MHz). The base station antenna 100 may cover a plurality of bands, in other words, the base station antenna 100 may be well applied in the multi-band scenario. It should be understood that application of the base station antenna 100 in a band may be implemented by adjusting lengths, shapes, and the like of the first radiation arm 51, the second radiation arm 52, the third radiation arm 53, and the fourth radiation arm 54.

The foregoing describes an implementation of the base station antenna 100 with reference to related accompanying drawings. The following further describes implementations of several base station antennas 100 in detail with reference to related accompanying drawings. Technical content that is the same as that in the foregoing implementation is not described again.

Figure 10:
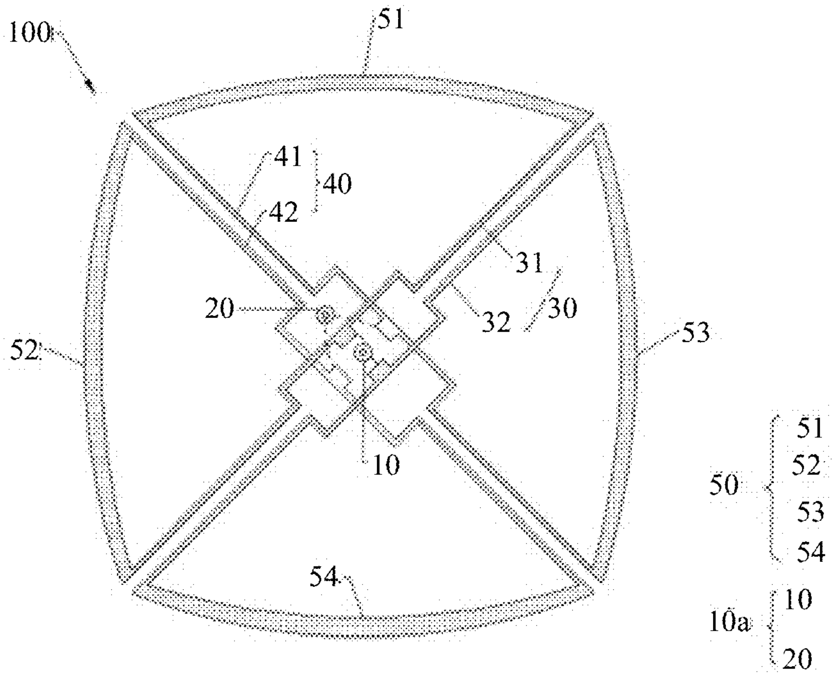
FIG. 10 is a diagram of a structure of another base station antenna according to an embodiment of this application.

FIG. 10 is a diagram of a structure of another base station antenna 100 according to an embodiment of this application. FIG. 10 shows another implementation of a first feeder 10, a second feeder 20, a first transmission line 30, a second transmission line 40, and a radiator 50 shown in FIG. 4. As shown in FIG. 10, a first radiation arm 51, a second radiation arm 52, a third radiation arm 53, and a fourth radiation arm 54 may alternatively be in a curve shape. For example, the first radiation arm 51, the second radiation arm 52, the third radiation arm 53, and the fourth radiation arm 54 are arc-shaped. In this way, the first radiation arm 51, the second radiation arm 52, the third radiation arm 53, and the fourth radiation arm 54 can be more easily adapted to different application environments, so that +45° polarization and −45° polarization are more easily generated when the first radiation arm 51, the second radiation arm 52, the third radiation arm 53, and the fourth radiation arm 54 feed a signal.

In another implementation, at least one of the first radiation arm 51, the second radiation arm 52, the third radiation arm 53, and the fourth radiation arm 54 is in a curve shape.

Figure 11:
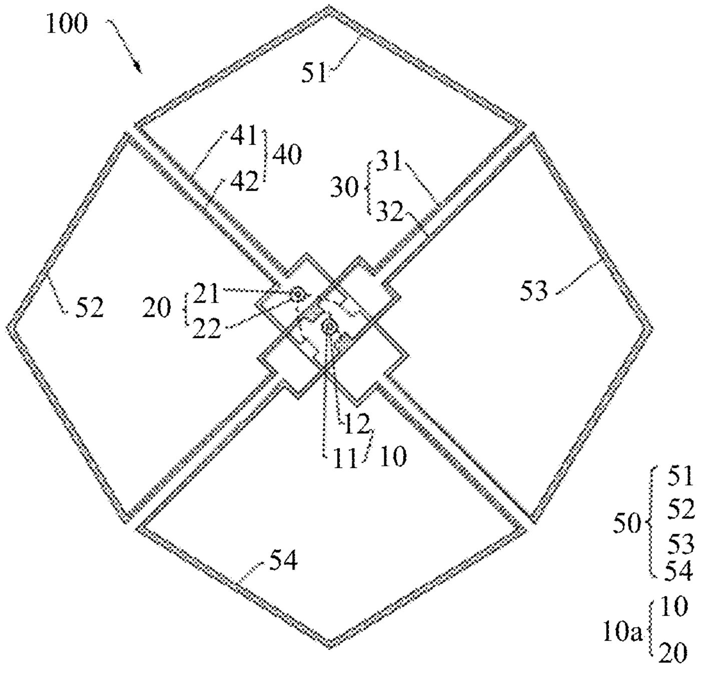
FIG. 11 is a diagram of a structure of still another base station antenna according to an embodiment of this application.

FIG. 11 is a diagram of a structure of still another base station antenna 100 according to an embodiment of this application. FIG. 11 shows still another implementation of a first feeder 10, a second feeder 20, a first transmission line 30, a second transmission line 40, and a radiator 50 shown in FIG. 4. As shown in FIG. 11, a first radiation arm 51, a second radiation arm 52, a third radiation arm 53, and a fourth radiation arm 54 are in a bent shape. FIG. 11 shows that the first radiation arm 51, the second radiation arm 52, the third radiation arm 53, and the fourth radiation arm 54 are disposed in a two-segment bending manner. In another implementation, the first radiation arm 51, the second radiation arm 52, the third radiation arm 53, and the fourth radiation arm 54 may alternatively be disposed in a multi-segment bending manner, for example, a three-segment bending manner or a four-segment bending manner.

It should be understood that, compared with the first radiation arm 51, the second radiation arm 52, the third radiation arm 53, and the fourth radiation arm 54 shown in FIG. 5, in some embodiments, the first radiation arm 51, the second radiation arm 52, the third radiation arm 53, and the fourth radiation arm 54 are disposed in a bent shape, so that a length of the first radiation arm 51, a length of the second radiation arm 52, a length of the third radiation arm 53, and a length of the fourth radiation arm 54 can be increased, thereby optimizing a horizontal plane beam width and a cross-polarization ratio of the base station antenna 100.

In another implementation, at least one of the first radiation arm 51, the second radiation arm 52, the third radiation arm 53, and the fourth radiation arm 54 is in a bent shape.

Figure 12:
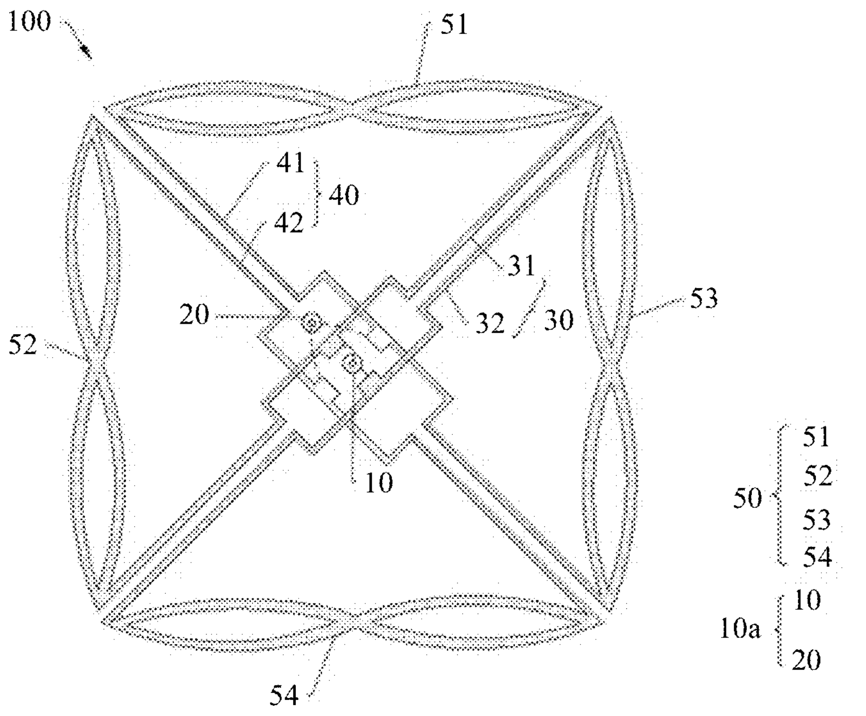
FIG. 12 is a diagram of a structure of yet another base station antenna according to an embodiment of this application.

FIG. 12 is a diagram of a structure of yet another base station antenna 100 according to an embodiment of this application. FIG. 12 shows yet another implementation of a first feeder 10, a second feeder 20, a first transmission line 30, a second transmission line 40, and a radiator 50 shown in FIG. 4. As shown in FIG. 12, a part or all of the first radiation arm 51 may be in a hollow shape. A part or all of the second radiation arm 52 may be in a hollow shape. A part or all of the third radiation arm 53 may be in a hollow shape. A part or all of the fourth radiation arm 54 may be in a hollow shape. In this way, compared with the first radiation arm 51, the second radiation arm 52, the third radiation arm 53, and the fourth radiation arm 54 shown in FIG. 5, in some embodiments, a line width of the first radiation arm 51, a line width of the second radiation arm 52, a line width of the third radiation arm 53, and a line width of the fourth radiation arm 54 are larger, thereby increasing a bandwidth of the base station antenna 100.

FIG. 12 shows that two parts of the first radiation arm 51 are of a hollow structure, two parts of the second radiation arm 52 are of a hollow structure, two parts of the third radiation arm 53 are of a hollow structure, and two parts of the fourth radiation arm 54 are of a hollow structure. In another implementation, one or more parts of the first radiation arm 51 may alternatively be of a hollow structure. One or more parts of the second radiation arm 52 may alternatively be of a hollow structure. One or more parts of the third radiation arm 53 may alternatively be of a hollow structure. One or more parts of the fourth radiation arm 54 may alternatively be of a hollow structure.

In another implementation, one or more parts of at least one of the first radiation arm 51, the second radiation arm 52, the third radiation arm 53, and the fourth radiation arm 54 may be in a hollow shape.

Figure 13:
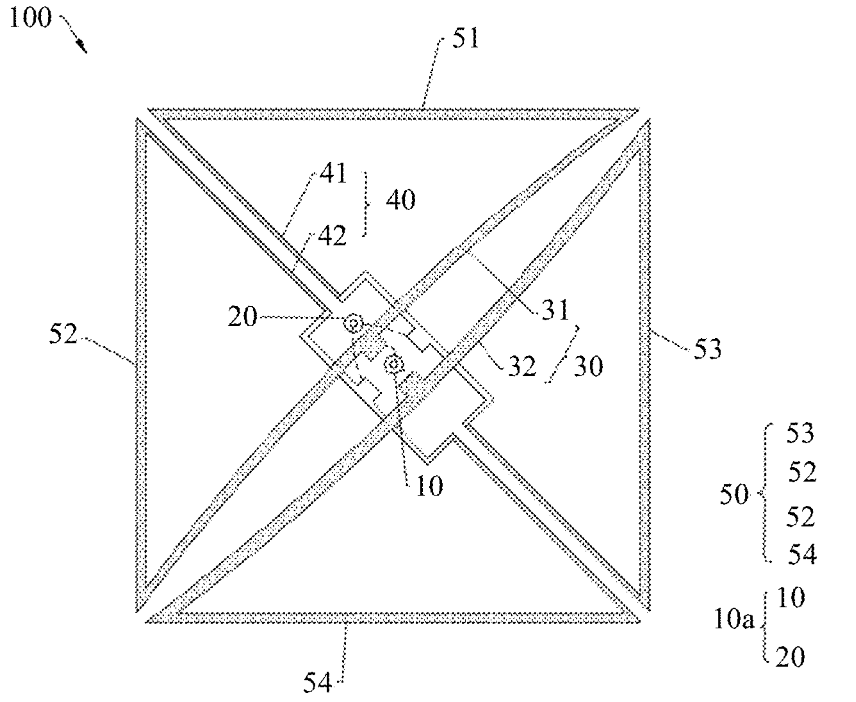
FIG. 13 is a diagram of a structure of yet another base station antenna according to an embodiment of this application.

FIG. 13 is a diagram of a structure of yet another base station antenna 100 according to an embodiment of this application. FIG. 13 shows yet another implementation of a first feeder 10, a second feeder 20, a first transmission line 30, a second transmission line 40, and a radiator 50 shown in FIG. 4. As shown in FIG. 13, both a first wire 31 and a second wire 32 of the first transmission line 30 are in a curved shape. For example, the first wire 31 and the second wire 32 may be arc-shaped. It should be noted that, if the first space S1 shown in FIG. 6 needs to be set, a part or all of space between two arc-shaped wires: the first wire 31 and the second wire 32 in FIG. 13 may be used as the first space S1.

In another implementation, in the solutions shown in FIG. 10 to FIG. 12, a third wire 41 and a fourth wire 42 may alternatively be disposed in a manner of using the technical solution of embodiments of this application.

Figure 14:
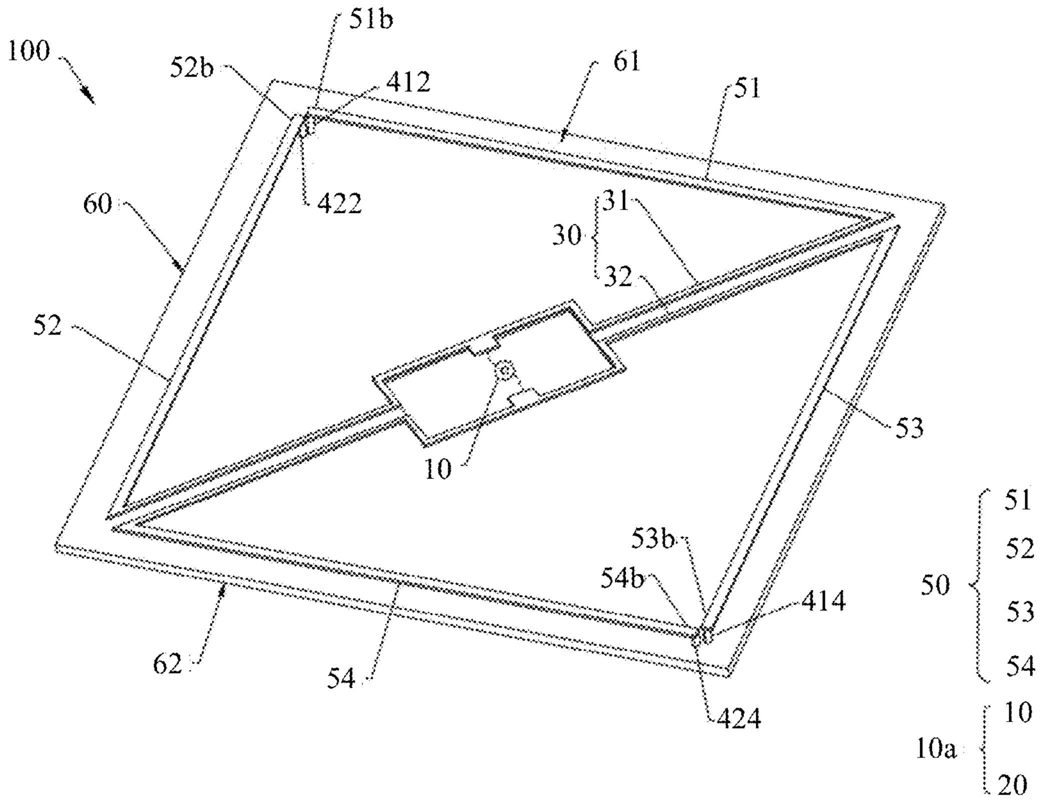
FIG. 14 is a diagram of a structure of yet another base station antenna according to an embodiment of this application.
Figure 15:
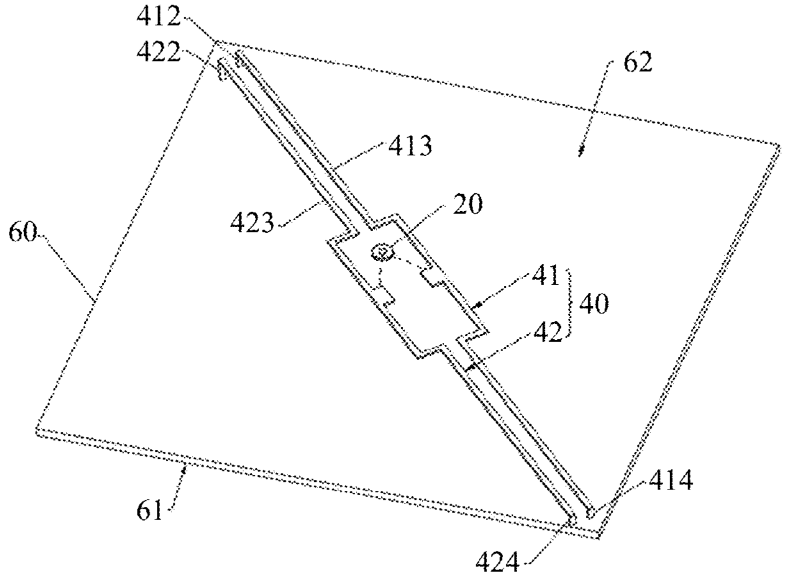
FIG. 15 is a diagram of a structure of the base station antenna shown in FIG. 14 from another perspective.

FIG. 14 is a diagram of a structure of yet another base station antenna 100 according to an embodiment of this application. FIG. 15 shows yet another implementation of a first feeder 10, a second feeder 20, a first transmission line 30, a second transmission line 40, and a radiator 50 shown in FIG. 4. FIG. 15 is a diagram of a structure of the base station antenna 100 shown in FIG. 14 from another perspective. It should be understood that FIG. 14 is a diagram of a structure from a perspective of the first surface 61 of the dielectric layer 60. FIG. 15 is a diagram of a structure from a perspective of the second surface 62 of the dielectric layer 60. As shown in FIG. 14 and FIG. 15, a third wire 41 includes a second part 412, a third part 413, and a fourth part 414 that are connected in sequence. The third part 413 is disposed on the second surface 62 of the dielectric layer 60. Both the second part 412 and the fourth part 414 are disposed between the first surface 61 and the second surface 62. Both the second part 412 and the fourth part 414 may be embedded in the dielectric layer 60. Compared with the structure of the third wire 41 in the first implementation, the third wire 41 in some embodiments does not include a first part 411 and a fifth part 415. In some embodiments, the third wire 41 is no longer disposed on the first surface 61. The third wire 41 may not be disposed on a same plane as the radiator 50 and the first transmission line 30. In addition, for a manner of disposing the third part 413, refer to a manner of disposing a first wire 31.

The second part 412 of the third wire 41 is directly connected to a second end 51*b* of a first radiation arm 51. The fourth part 414 of the third wire 41 is directly connected to a second end 53*b* of a third radiation arm 53.

For a manner of disposing a fourth wire 42, refer to a manner of disposing the third wire 41. For example, a second part 422 of the fourth wire 42 is directly connected to a second end 52*b* of a second radiation arm 52. A fourth part 424 of the fourth wire 42 is directly connected to a second end 54*b* of a fourth radiation arm 54. Details are not described herein again.

In another implementation, in the solutions shown in FIG. 10 to FIG. 12, the third wire 41 and the fourth wire 42 may alternatively be disposed in a manner of using the technical solution of this application.

Figure 16:
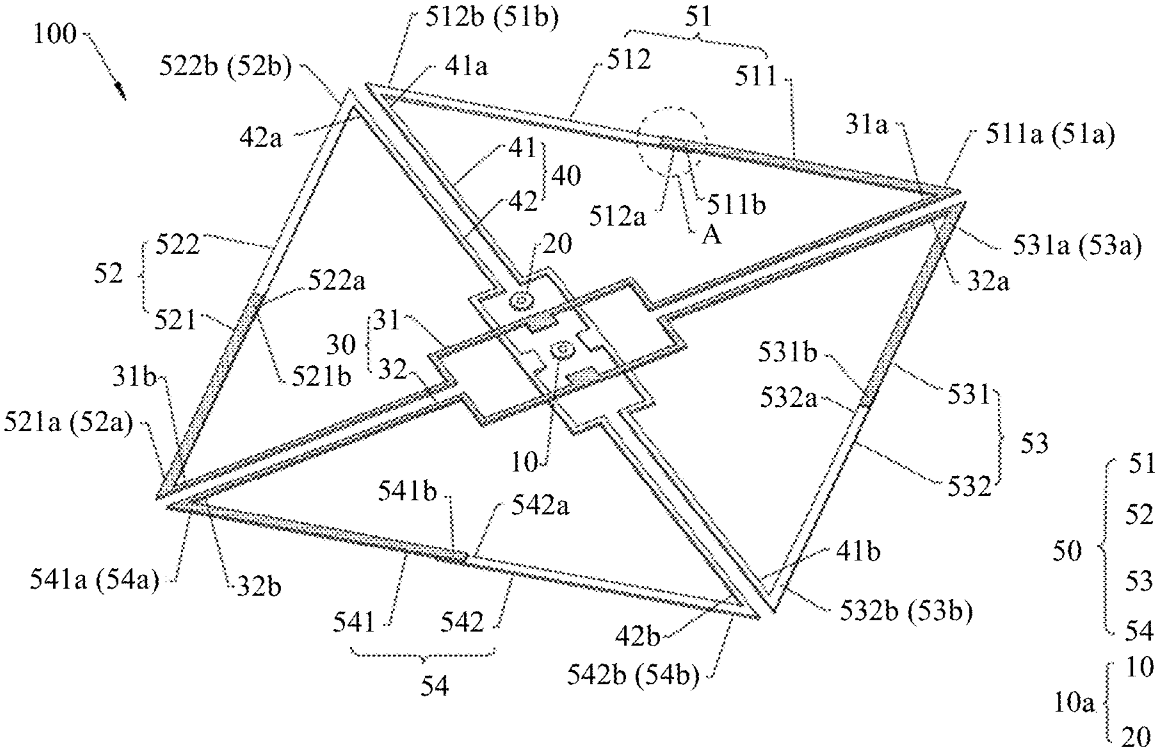
FIG. 16 is a diagram of a structure of yet another base station antenna according to an embodiment of this application.

FIG. 16 is a diagram of a structure of yet another base station antenna 100 according to an embodiment of this application. FIG. 16 shows yet another implementation of a first feeder 10, a second feeder 20, a first transmission line 30, a second transmission line 40, and a radiator 50 shown in FIG. 4. As shown in FIG. 16, a first radiation arm 51 includes a first radiation section 511 and a second radiation section 512. The first radiation section 511 includes a first end 511*a* and a second end 511*b*. The second radiation section 512 includes a first end 512*a* and a second end 512*b*. The first end 511*a* of the first radiation section 511 is a first end 51*a* of the first radiation arm 51. The second end 512*b* of the second radiation section 512 is a second end 51*b* of the first radiation arm 51.

Figure 17:
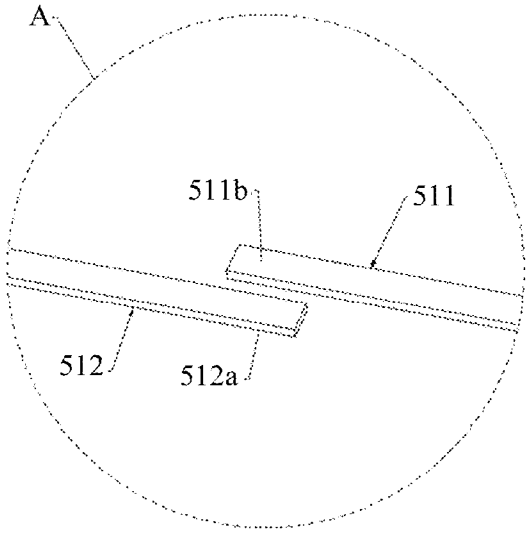
FIG. 17 is an enlarged diagram of the base station antenna shown in FIG. 16 at a place A.

FIG. 17 is an enlarged diagram of the base station antenna 100 shown in FIG. 16 at a place A. As shown in FIG. 17, the second end 511*b* of the first radiation section 511 may be disposed opposite to the first end 512*a* of the second radiation section 512. In some embodiments, the second end 511*b* of the first radiation section 511 is disposed opposite to the first end 512*a* of the second radiation section 512 in a longitudinal direction. How to dispose the ends in a longitudinal direction is described in detail below with reference to related accompanying drawings. In addition, the second end 511*b* of the first radiation section 511 may alternatively be disposed opposite to the first end 512*a* of the second radiation section 512 in a transversal direction. The following also provides detailed descriptions with reference to related accompanying drawings. Details are not described herein again.

A second radiation arm 52 includes a third radiation section 521 and a fourth radiation section 522. The third radiation section 521 includes a first end 521*a* and a second end 521*b*. The fourth radiation section 522 includes a first end 522*a* and a second end 522*b*. The first end 521*a* of the third radiation section 521 is a first end 52*a* of the second radiation arm 52. The second end 522*b* of the fourth radiation section 522 is a second end 52*b* of the second radiation arm 52. The second end 521*b* of the third radiation section 521 may be disposed opposite to the first end 522*a* of the fourth radiation section 522. For a manner in which the second end 521*b* of the third radiation section 521 is disposed opposite to the first end 522*a* of the fourth radiation section 522, refer to a manner in which the second end 511*b* of the first radiation section 511 is disposed opposite to the first end 512*a* of the second radiation section 512. Details are not described herein again.

A third radiation arm 53 includes a fifth radiation section 531 and a sixth radiation section 532. The fifth radiation section 531 includes a first end 531*a* and a second end 531*b*. The sixth radiation section 532 includes a first end 532*a* and a second end 532*b*. The first end 531*a* of the fifth radiation section 531 is a first end 53*a* of the third radiation arm 53. The second end 532*b* of the sixth radiation section 532 is a second end 53*b* of the third radiation arm 53. The second end 531*b* of the fifth radiation section 531 may be disposed opposite to the first end 532*a* of the sixth radiation section 532. For a manner in which the second end 531*b* of the fifth radiation section 531 is disposed opposite to the first end 532*a* of the sixth radiation section 532, refer to a manner in which the second end 511*b* of the first radiation section 511 is disposed opposite to the first end 512*a* of the second radiation section 512. Details are not described herein again.

A fourth radiation arm 54 includes a seventh radiation section 541 and an eighth radiation section 542. The seventh radiation section 541 includes a first end 541*a* and a second end 541*b*. The eighth radiation section 542 includes a first end 542*a* and a second end 542*b*. The first end 541*a* of the seventh radiation section 541 is a first end 54*a* of the fourth radiation arm 54. The second end 542*b* of the eighth radiation section 542 is a second end 54*b* of the fourth radiation arm 54. The second end 541*b* of the seventh radiation section 541 may be disposed opposite to the first end 542*a* of the eighth radiation section 542. For a manner in which the second end 541*b* of the seventh radiation section 541 is disposed opposite to the first end 542*a* of the eighth radiation section 542, refer to a manner in which the second end 511*b* of the first radiation section 511 is disposed opposite to the first end 512*a* of the second radiation section 512. Details are not described herein again.

As shown in FIG. 16, the first end 511*a* of the first radiation section 511 is electrically connected to a first end 31*a* of a first wire 31. The first end 521*a* of the third radiation section 521 is electrically connected to a second end 31*b* of the first wire 31. The first end 531*a* of the fifth radiation section 531 is electrically connected to a first end 32*a* of a second wire 32. The first end 541*a* of the seventh radiation section 541 is electrically connected to a second end 32*b* of the second wire 32.

In some embodiments, the first radiation section 511, the third radiation section 521, and the first wire 31 are of an integrally formed structure. In this way, steps of producing the first radiation section 511, the third radiation section 521, and the first wire 31 can be simplified, thereby reducing costs. In another implementation, a manner of connecting the first radiation section 511, the third radiation section 521, and the first wire 31 is not limited.

For example, the fifth radiation section 531, the seventh radiation section 541, and the second wire 32 may also be of an integrally formed structure.

As shown in FIG. 16, the second end 512*b* of the second radiation section 512 is electrically connected to a first end 41*a* of a third wire 41. The second end 532*b* of the sixth radiation section 532 is electrically connected to a second end 41*b* of the third wire 41. The second end 522*b* of the fourth radiation section 522 is electrically connected to a first end 42*a* of a fourth wire 42. The second end 542*b* of the eighth radiation section 542 is electrically connected to a second end 42*b* of the fourth wire 42.

In some embodiments, the second radiation section 512, the sixth radiation section 532, and the third wire 41 are of an integrally formed structure. In this way, steps of producing the second radiation section 512, the sixth radiation section 532, and the third wire 41 can be simplified, thereby reducing costs. In another implementation, a manner of connecting the second radiation section 512, the sixth radiation section 532, and the third wire 41 is not limited.

For example, the fourth radiation section 522, the eighth radiation section 542, and the fourth wire 42 are of an integrally formed structure.

Figure 18:
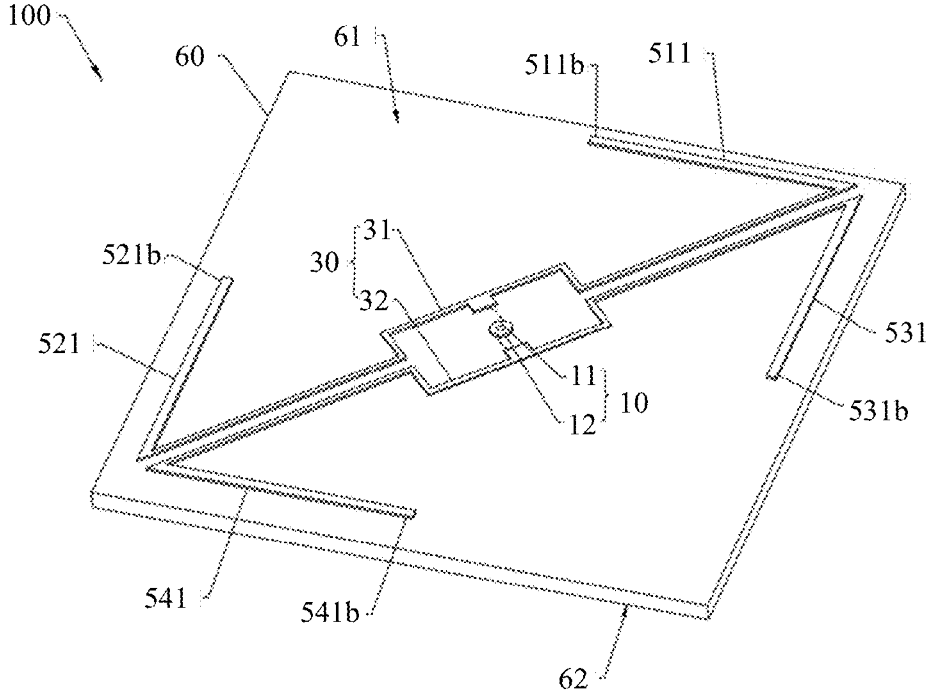
FIG. 18 is a diagram of a structure of yet another base station antenna according to an embodiment of this application.

FIG. 18 is a diagram of a structure of yet another base station antenna 100 according to an embodiment of this application. FIG. 18 shows an implementation in which the first feeder 10, the first transmission line 30, and a part of the radiator 50 shown in FIG. 16 cooperate with the dielectric layer 60. As shown in FIG. 18, the first wire 31 of the first transmission line 30, the second wire 32 of the first transmission line 30, the first radiation section 511, the third radiation section 521, the fifth radiation section 531, and the seventh radiation section 541 are disposed on the first surface 61 of the dielectric layer 60.

Figure 19:
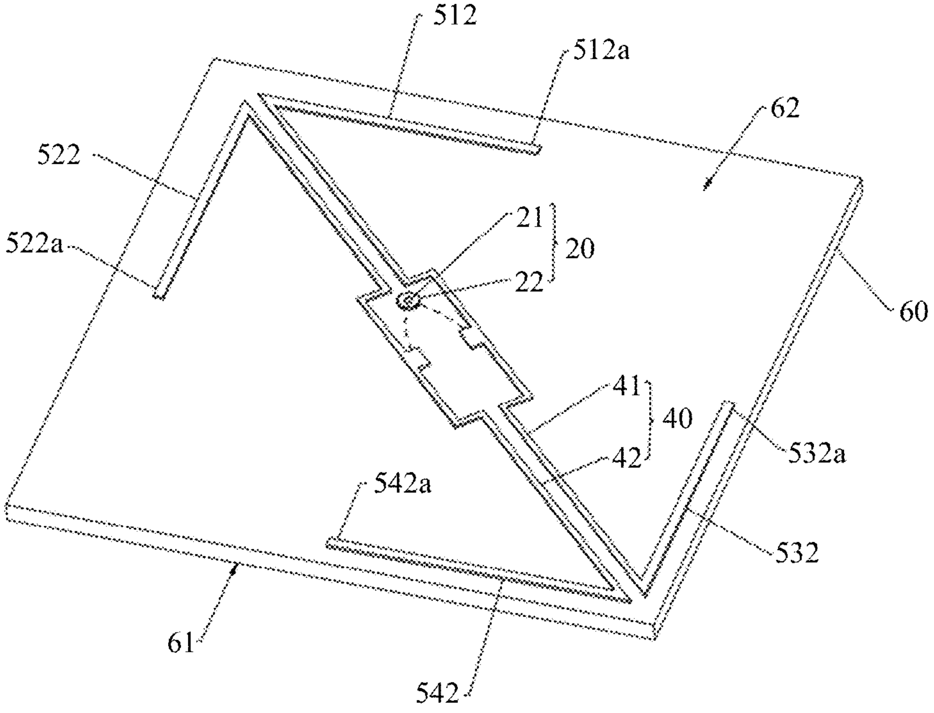
FIG. 19 is a diagram of a structure of the base station antenna shown in FIG. 18 from another perspective.

FIG. 19 is a diagram of a structure of the base station antenna 100 shown in FIG. 18 from another perspective. FIG. 19 shows an implementation in which the second feeder 20, the second transmission line 40, and a part of the radiator 50 shown in FIG. 16 cooperate with the dielectric layer 60. As shown in FIG. 19, the third wire 41 of the second transmission line 40, the fourth wire 42 of the second transmission line 40, the second radiation section 512, the fourth radiation section 522, the sixth radiation section 532, and the eighth radiation section 542 are disposed on the second surface 62 of the dielectric layer 60.

It may be understood that the first radiation section 511 is disposed on the first surface 61 of the dielectric layer 60, and the second radiation section 512 is disposed on the second surface 512 of the dielectric layer 60, so that the first radiation section 511 and the second radiation section 512 are arranged in a thickness direction of the dielectric layer 60. In this way, the second end 511*b* of the first radiation section 511 is disposed opposite to the first end 512*a* of the second radiation section 512 in the thickness direction of the dielectric layer 60, for example, disposed opposite to the first end 512*a* of the second radiation section 512 in a longitudinal direction. Similarly, the second end 521*b* of the third radiation section 521 may be disposed opposite to the first end 522*a* of the fourth radiation section 522 in a longitudinal direction. The second end 531*b* of the fifth radiation section 531 may be disposed opposite to the first end 532*a* of the sixth radiation section 532 in a longitudinal direction. The second end 541*b* of the seventh radiation section 541 may be disposed opposite to the first end 542*a* of the eighth radiation section 542 in a longitudinal direction.

In some embodiments, the first transmission line 30, the second transmission line 40, the radiator 50, and the dielectric layer 60 of the base station antenna 100 may be of a circuit board structure. In another implementation, the base station antenna 100 may alternatively not include the dielectric layer 60. The first transmission line 30, the second transmission line 40, and the radiator 50 of the base station antenna 100 may be of a pure metal (for example, a sheet metal) structure.

As shown in FIG. 18 and FIG. 19, and with reference to FIG. 17, the second end 511*b* of the first radiation section 511 is coupled to the first end 512*a* of the second radiation section 512. In this way, a signal may be transmitted to the first end 512*a* of the second radiation section 512 through the second end 511*b* of the first radiation section 511. The signal may alternatively be transmitted to the second end 511*b* of the first radiation section 511 through the first end 512*a* of the second radiation section 512. In addition, the second end 521*b* of the third radiation section 521 is coupled to the first end 522*a* of the fourth radiation section 522. The second end 531*b* of the fifth radiation section 531 is coupled to the first end 532*a* of the sixth radiation section 532. The second end 541*b* of the seventh radiation section 541 is coupled to the first end 542*a* of the eighth radiation section 542.

In an implementation, a thickness of the dielectric layer 60 (a distance between the first surface 61 and the second surface 62 of the dielectric layer 60) is within a range of 0 to 0.1λ. λ is an operating wavelength of the base station antenna 100. In this way, a coupling effect between the second end 511*b* of the first radiation section 511 and the first end 512*a* of the second radiation section 512 is strong, a coupling effect between the second end 521*b* of the third radiation section 521 and the first end 522*a* of the fourth radiation section 522 is strong, a coupling effect between the second end 531*b* of the fifth radiation section 531 and the first end 532*a* of the sixth radiation section 532 is strong, and a coupling effect between the second end 541*b* of the seventh radiation section 541 and the first end 542*a* of the eighth radiation section 542 is strong.

As shown in FIG. 18, one of a feed end 11 of the first feeder 10 and a ground end 12 of the first feeder 10 is electrically connected to the first wire 31, and the other is electrically connected to the second wire 32. For a manner of electrically connecting the first feeder to the first wire 31 and the second wire 32 of the first transmission line 30, refer to a manner of electrically connecting the first feeder 10 to the first wire 31 and the second wire 32 in the foregoing implementation (where for details, refer to FIG. 6). Details are not described herein again.

As shown in FIG. 19, one of a feed end 21 of the second feeder 20 and a ground end 22 of the second feeder 20 is electrically connected to the third wire 41, and the other is electrically connected to the fourth wire 42. For a manner of electrically connecting the second feeder 20 to the third wire 41 and the fourth wire 42 of the second transmission line 40, refer to a manner of electrically connecting the second feeder 20 to the third wire 41 and the fourth wire 42 in the foregoing implementation (where for details, refer to FIG. 7). Details are also not described herein again.

In some embodiments, the base station antenna 100 may generate two types of polarization. Currents of the two types of polarization are basically the same as the currents of the two types of polarization in the foregoing implementation (where for details, refer to FIG. 8 and FIG. 9). For details, refer to the currents of the two types of polarization in the foregoing implementations (where for details, refer to FIG. 8 and FIG. 9). Details are not described herein again.

For example, one of the two types of polarization may be +45° polarization, and the other may be −45° polarization.

In some embodiments, the base station antenna 100 may support a signal in a low band (for example, a band whose frequency is in a range of 690 MHz to 960 MHz), and the base station antenna 100 may also support working in a high band (for example, a band whose frequency is in a range of 1695 MHz to 2700 MHz). The base station antenna 100 may cover a plurality of bands, in other words, the base station antenna 100 may be well applied in a multi-band scenario. It should be understood that application of the base station antenna 100 in a band may be implemented by adjusting lengths, shapes, and the like of the first radiation section 511, the second radiation section 512, the third radiation section 521, the fourth radiation section 522, the fifth radiation section 531, the sixth radiation section 532, the seventh radiation section 541, and the eighth radiation section 542.

Figure 20:
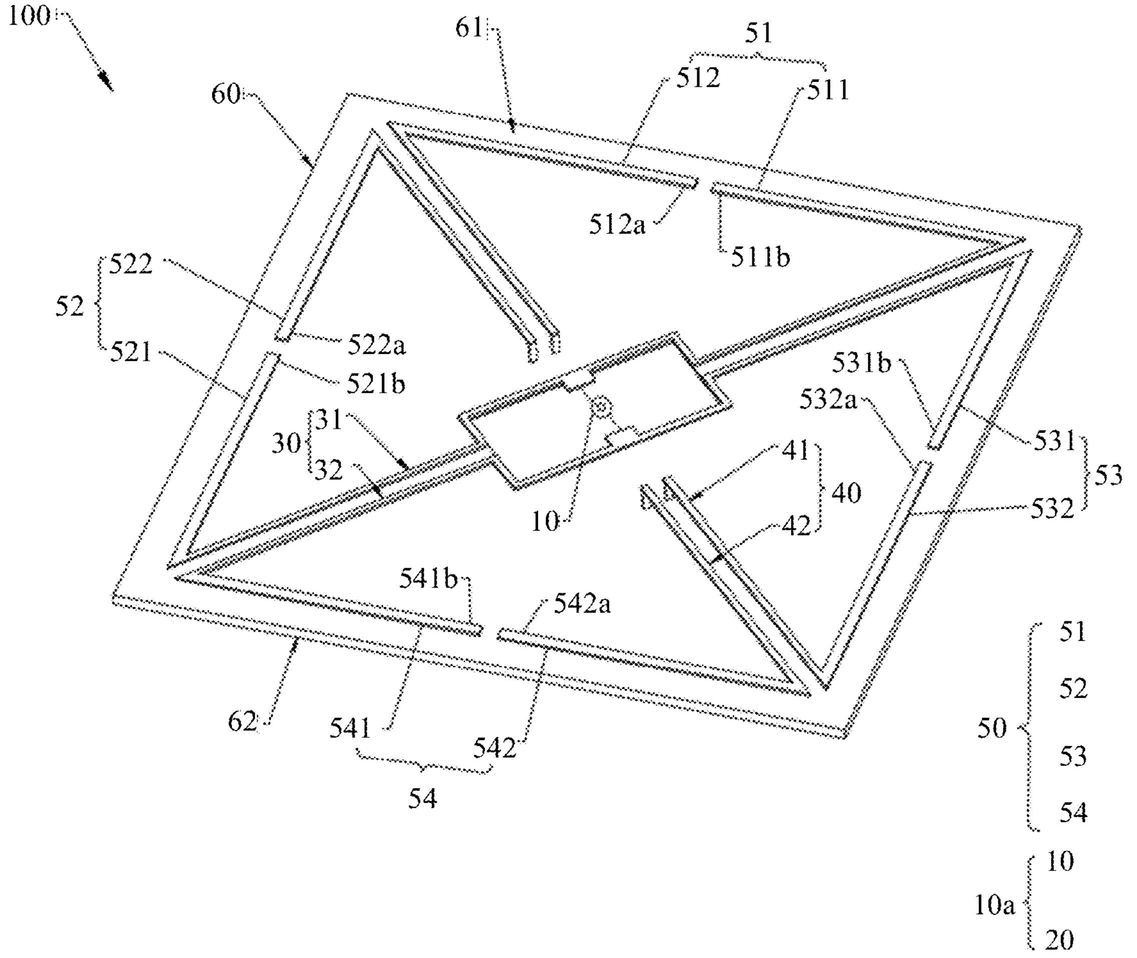
FIG. 20 is a diagram of a structure of yet another base station antenna according to an embodiment of this application.

FIG. 20 is a diagram of a structure of yet another base station antenna 100 according to an embodiment of this application. FIG. 20 shows yet another implementation of a first feeder 10, a second feeder 20, a first transmission line 30, a second transmission line 40, and a radiator 50 shown in FIG. 4. As shown in FIG. 20, a first radiation section 511, a second radiation section 512, a third radiation section 521, a fourth radiation section 522, a fifth radiation section 531, a sixth radiation section 532, a seventh radiation section 541, and an eighth radiation section 542 are disposed on the first surface 61 of the dielectric layer 60. In other words, the radiator 50 of the base station antenna 100 is disposed on the first surface 61 of the dielectric layer 60.

In some embodiments, a second end 511*b* of the first radiation section 511 is disposed opposite to a first end 512*a* of the second radiation section 512 on a same plane of the dielectric layer 60, for example, disposed opposite to the first end 512*a* of the second radiation section 512 in a transversal direction. Similarly, a second end 521*b* of the third radiation section 521 may be disposed opposite to a first end 522*a* of the fourth radiation section 522 on a same plane. A second end 531*b* of the fifth radiation section 531 may be disposed opposite to a first end 532*a* of the sixth radiation section 532 on a same plane. A second end 541*b* of the seventh radiation section 541 may be disposed opposite to a first end 542*a* of the eighth radiation section 542 on a same plane.

In addition, the second end 511*b* of the first radiation section 511 is coupled to the first end 512*a* of the second radiation section 512. The second end 521*b* of the third radiation section 521 is coupled to the first end 522*a* of the fourth radiation section 522. The second end 531*b* of the fifth radiation section 531 is coupled to the first end 532*a* of the sixth radiation section 532. The second end 541*b* of the seventh radiation section 541 is coupled to the first end 542*a* of the eighth radiation section 542.

For a manner of disposing the first transmission line 30, refer to a manner of disposing the first transmission line 30 in FIG. 6. For a manner of disposing the second transmission line 40, refer to a manner of disposing the second transmission line 40 in FIG. 6 and FIG. 7. For a manner of electrically connecting the first feeder to a first wire 31 and a second wire 32 of the first transmission line 30, refer to a manner of electrically connecting the first feeder 10 to the first wire 31 and the second wire 32 in the foregoing implementation (where for details, refer to FIG. 6). For a manner of electrically connecting the second feeder 20 to a third wire 41 and a fourth wire 42 of the second transmission line 40, refer to a manner of electrically connecting the second feeder 20 to the third wire 41 and the fourth wire 42 in the foregoing implementation (where for details, refer to FIG. 7). Details are not described herein again.

In some embodiments, the first transmission line 30, the second transmission line 40, and the radiator 50 of the base station antenna 100 may be disposed on a same plane to a large extent, so that space occupied by the base station antenna 100 is reduced to a large extent, and a structure of the base station antenna 100 is simplified.

The foregoing describes implementations of several base station antennas 100 with reference to related accompanying drawings. The base station antennas 100 are dual-polarized antennas. The following describes implementations of several other base station antennas 100 in detail with reference to related accompanying drawings. The base station antennas 100 are single-polarized antennas.

Figure 21:
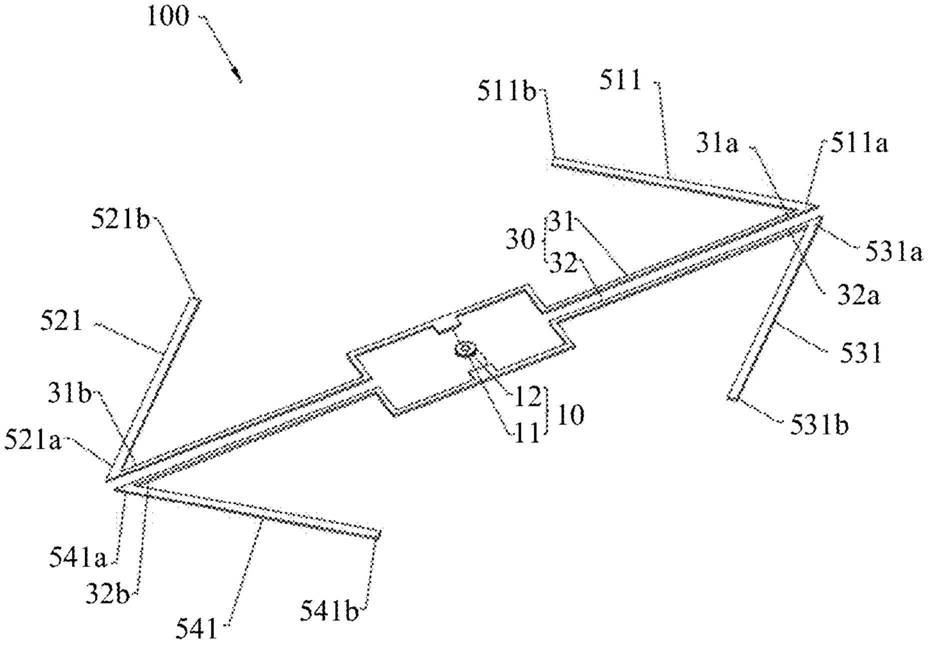
FIG. 21 is a diagram of a structure of yet another base station antenna according to an embodiment of this application.

FIG. 21 is a diagram of a structure of yet another base station antenna 100 according to an embodiment of this application. As shown in FIG. 21, the base station antenna 100 includes a first transmission line 30 and a radiator 50. The first transmission line 30 includes a first wire 31 and a second wire 32 that are spaced apart and disposed in parallel. For a manner of disposing the first transmission line 30, refer to a manner of disposing the first transmission line 30 shown in FIG. 6, or a manner of disposing the first transmission line 30 shown in FIG. 13. Details are not described herein again.

The radiator 50 includes a first radiation section 511, a third radiation section 521, a fifth radiation section 531, and a seventh radiation section 541.

The first radiation section 511 includes a first end 511*a* and a second end 511*b*. The third radiation section 521 includes a first end 521*a* and a second end 521*b*. The first end 511*a* of the first radiation section 511 may be disposed opposite to the first end 521*a* of the third radiation section 521. The second end 511*b* of the first radiation section 511 is located on a side of the first end 511*a* of the first radiation section 511 away from the fifth radiation section 531. The second end 521*b* of the third radiation section 521 is located on a side of the first end 521*a* of the third radiation section 521 away from the seventh radiation section 541.

The fifth radiation section 531 includes a first end 531*a* and a second end 531*b*. The seventh radiation section 541 includes a first end 541*a* and a second end 541*b*. The first end 531*a* of the fifth radiation section 531 may be disposed opposite to the first end 541*a* of the seventh radiation section 541. The second end 531*b* of the fifth radiation section 531 is located on a side of the first end 531*a* of the fifth radiation section 531 away from the first radiation section 511. The second end 541*b* of the seventh radiation section 541 is located on a side of the first end 541*a* of the seventh radiation section 541 away from the third radiation section 521.

The first end 511*a* of the first radiation section 511 is electrically connected to a first end 31*a* of the first wire 31. The first end 521*a* of the third radiation section 521 is electrically connected to a second end 31*b* of the first wire 31. In this way, both the second end 511*b* of the first radiation section 511 and the second end 521*b* of the third radiation section 521 are located on a side of the first wire 31 away from the second wire 32.

In addition, the first end 531*a* of the fifth radiation section 531 is electrically connected to a first end 32*a* of the second wire 32. The first end 541*a* of the seventh radiation section 541 is electrically connected to a second end 32*b* of the second wire 32. In this way, both the second end 531*b* of the fifth radiation section 531 and the second end 541*b* of the seventh radiation section 541 are located on a side of the second wire 32 away from the first wire 31.

For example, the first radiation section 511, the third radiation section 521, the fifth radiation section 531, and the seventh radiation section 541 may be in a "strip" shape. A square structure may be approximately enclosed by the first radiation section 511, the third radiation section 521, the fifth radiation section 531, and the seventh radiation section 541. In another implementation, the radiator 50 may alternatively be in another shape. For example, shapes shown in FIG. 10, FIG. 11, and FIG. 12 are not limited in this application.

A feeding network 10*a* includes a first feeder 10. One of a feed end 11 of the first feeder 10 and a ground end 12 of the first feeder 10 is electrically connected to the first wire 31, and the other is electrically connected to the second wire 32. In other words, when the feed end 11 of the first feeder 10 is electrically connected to the first wire 31, the ground end 12 of the first feeder 10 is electrically connected to the second wire 32. When the feed end 11 of the first feeder 10 is electrically connected to the second wire 32, the ground end 12 of the first feeder 10 is electrically connected to the first wire 31.

Figure 22:
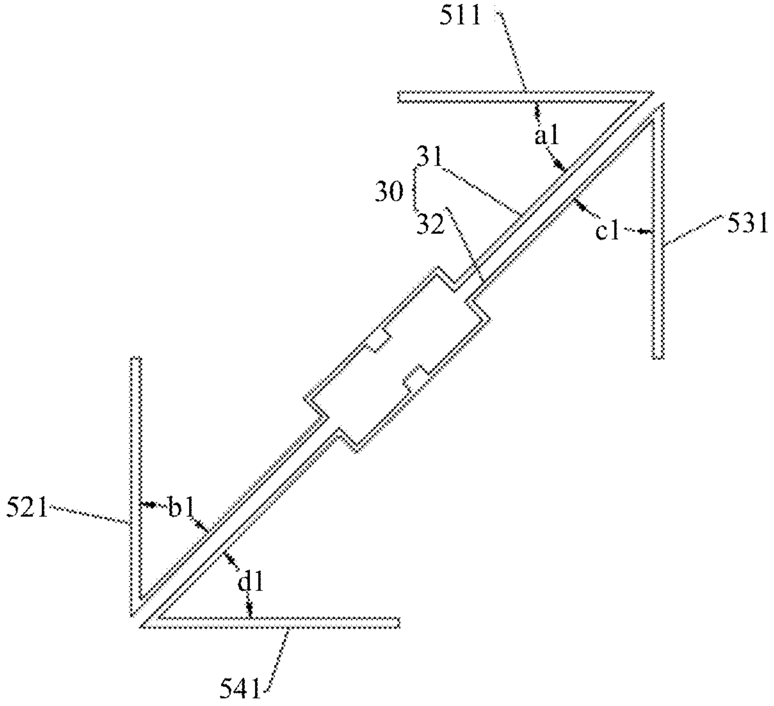
FIG. 22 is a diagram of a structure of the base station antenna shown in FIG. 21 from another perspective.

FIG. 22 is a diagram of a structure of the base station antenna 100 shown in FIG. 21 from another perspective. Alternatively, FIG. 22 is a diagram of a structure of the base station antenna 100 shown in FIG. 21 in a top view. As shown in FIG. 22, an angle between the first radiation section 511 and the first wire 31 toward the third radiation section 521 is a first angle a1. The first angle a1 meets $0° < a1 \leq 90°$. For example, the first angle a1 is equal to 45°. In this way, the first radiation section 511 and the first wire 31 are arranged compactly, and the first radiation section 511 and the first wire 31 occupy small space. For example, the first angle a may further meet $0° < a1 \leq 45°$.

In another implementation, the first angle a1 may alternatively be greater than 90°.

In some embodiments, an angle between the third radiation section 521 and the first wire 31 toward the first radiation section 511 is a third angle b1, where $0° < b1 \leq 90°$. For example, the third angle b1 is equal to 45°. In this way, the third radiation section 521 and the first wire 31 are arranged compactly, and the third radiation section 521 and the first wire 31 occupy small space. For example, the third angle b1 may further meet $0° < b1 \leq 45°$.

In another implementation, the third angle b1 may alternatively be greater than 90°.

In some embodiments, an angle between the fifth radiation section 531 and the second wire 32 toward the seventh radiation section 541 is a fifth angle c1, where $0° < c1 \leq 90°$. For example, the fifth angle c1 is equal to 45°. In this way, the fifth radiation section 531 and the second wire 32 are arranged compactly, and the fifth radiation section 531 and the second wire 32 occupy small space. For example, the fifth angle c1 may further meet $0° < c1 \leq 45°$.

In another implementation, the fifth angle c1 may alternatively be greater than 90°.

In some embodiments, an angle between the seventh radiation section 541 and the second wire 32 toward the fifth radiation section 531 is a seventh angle d1, where $0° < d1 \leq 90°$. For example, the seventh angle d1 is equal to 45°. In this way, the seventh radiation section 541 and the second wire 32 are arranged compactly, and the seventh radiation section 541 and the second wire 32 occupy small space. For example, the seventh angle d1 may further meet 0°<d1≤45°.

In another implementation, the seventh angle d1 may alternatively be greater than 90°.

In some embodiments, the base station antenna 100 is a single-polarized antenna. In other words, the base station antenna 100 may generate one type of polarization, for example, +45° polarization or −45° polarization.

In some embodiments, the first end 511*a* of the first radiation section 511 is electrically connected to the first end 521*a* of the third radiation section 521 through the first wire 31, and the first end 531*a* of the fifth radiation section 531 is electrically connected to the first end 541*a* of the seventh radiation section 541 through the second wire 32. In this way, the first radiation section 511, the third radiation section 521, and the first wire 31 can form a whole, and the fifth radiation section 531, the seventh radiation section 541, and the second wire 32 can form a whole. Then, one of the feed end 11 and the ground end 12 of the first feeder 10 is electrically connected to the first wire 31, and the other is electrically connected to the second wire 32, to feed power to the first radiation section 511, the third radiation section 521, the fifth radiation section 531, and the seventh radiation section 541 through the first feeder 10, so that the first radiation section 511, the third radiation section 521, the fifth radiation section 531, and the seventh radiation section 541 excite two dipoles. One dipole is excited by the first radiation section 511 and the fifth radiation section 531. The other dipole is excited by the third radiation section 521 and the seventh radiation section 541. It may be understood that when phases of the two dipoles are the same, the two dipoles can be superposed in a far field, thereby increasing an antenna gain of the base station antenna 100. In this way, the base station antenna 100 can achieve an effect of a binary array antenna. In addition, when power feeding is performed on the first radiation section 511, the third radiation section 521, the fifth radiation section 531, and the seventh radiation section 541 through the first feeder 10, the first radiation section 511, the third radiation section 521, the fifth radiation section 531, and the seventh radiation section 541 may generate one type of polarization. The base station antenna 100 in embodiments of this application has a simple feeding structure and low costs.

Figure 23:
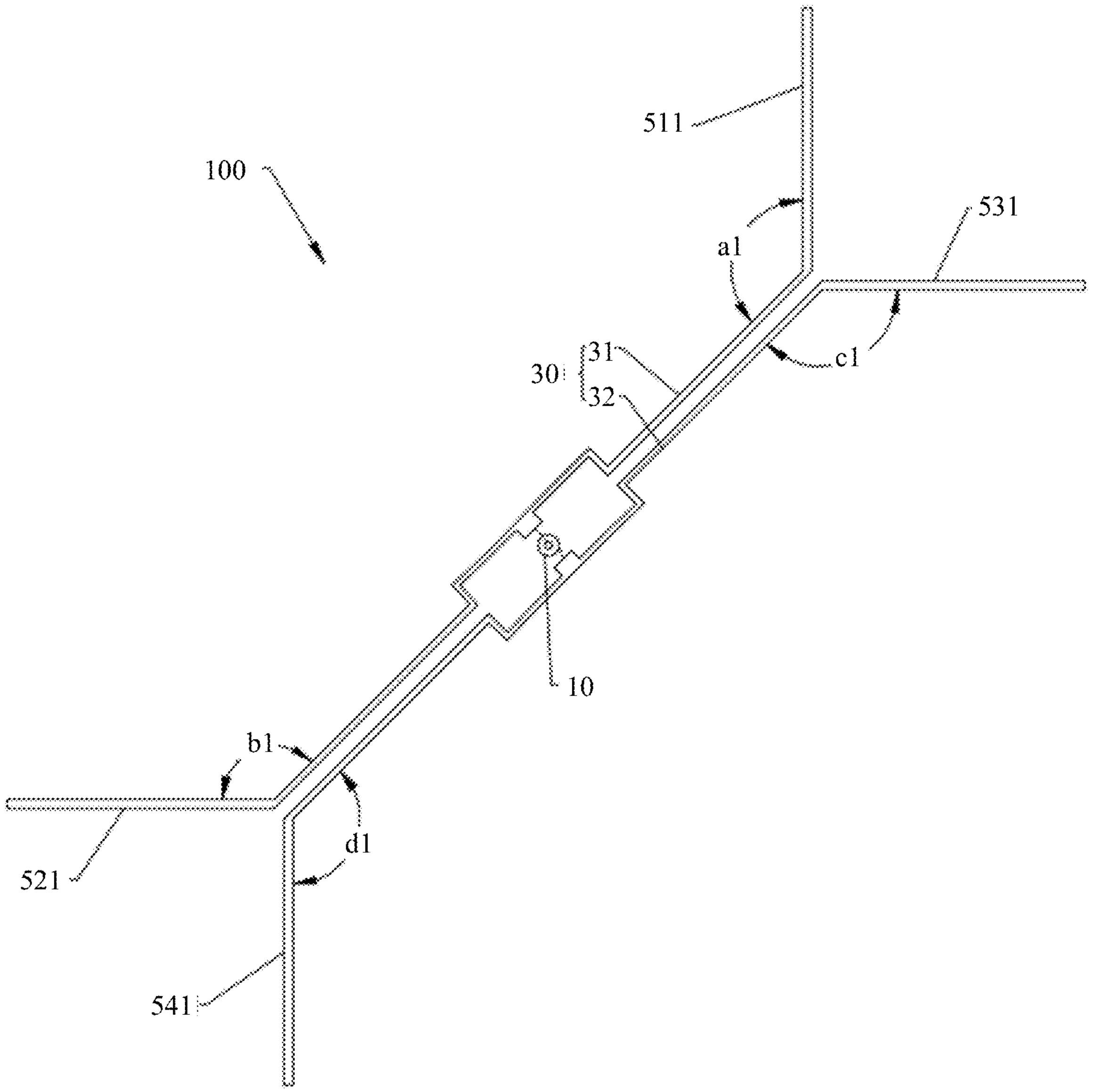
FIG. 23 is a diagram of a structure of yet another base station antenna according to an embodiment of this application.

FIG. 23 is a diagram of a structure of yet another base station antenna according to an embodiment of this application. As shown in FIG. 23, a first angle a is greater than 90°, a third angle b1 is greater than 90°, a fifth angle c1 is greater than 90°, and a seventh angle d1 is greater than 90°. It should be understood that, in some embodiments, the base station antenna 100 is also a single-polarized antenna. In other words, the base station antenna 100 may generate one type of polarization, for example, +45° polarization or −45° polarization.

In some embodiments, a first radiation section 511 and a fifth radiation section 531 are opened in a direction away from a first transmission line 30, and a third radiation section 521 and a seventh radiation section 541 are opened in a direction away from the first transmission line 30, so that antenna performance of the base station antenna 100 can be improved.

The foregoing descriptions are merely some embodiments of this application, but are not intended to limit the protection scope of this application. Any variation or replacement readily figured out by a person ordinarily skilled in the art, within the technical scope disclosed in this application, shall fall within the protection scope of this application. Therefore, the protection scope of this application shall be subject to the protection scope of the claims.

What is claimed is:

1. An antenna, comprising:

a feeding network, a first transmission line, a second transmission line, and a radiator, wherein the first transmission line is spaced apart from and crosses the second transmission line, the first transmission line comprises a first wire and a second wire that are spaced apart and disposed in parallel, and the second transmission line comprises a third wire and a fourth wire that are spaced apart and disposed in parallel;

the radiator comprises a first radiation arm, a second radiation arm, a third radiation arm, and a fourth radiation arm, a first end of the first radiation arm is electrically connected to a first end of the first wire, a second end of the first radiation arm is electrically connected to a first end of the third wire, a first end of the second radiation arm is electrically connected to a second end of the first wire, a second end of the second radiation arm is electrically connected to a first end of the fourth wire, a first end of the third radiation arm is electrically connected to a first end of the second wire, a second end of the third radiation arm is electrically connected to a second end of the third wire, a first end of the fourth radiation arm is electrically connected to a second end of the second wire, and a second end of the fourth radiation arm is electrically connected to a second end of the fourth wire; and the feeding network comprises a first feeder and a second feeder, one of a feed end of the first feeder and a ground end of the first feeder is electrically connected to the first wire, the other is electrically connected to the second wire, one of a feed end of the second feeder and a ground end of the second feeder is electrically connected to the third wire, and the other is electrically connected to the fourth wire.

2. The antenna according to claim 1, wherein an angle between the first radiation arm and the first wire toward the second radiation arm is a first angle a1, and 0°<a1≤90°.

3. The antenna according to claim 1, wherein one of the feed end of the first feeder and the ground end of the first feeder is electrically connected to a middle part of the first wire, and the other is electrically connected to a middle part of the second wire.

4. The antenna according to claim 1, wherein both the first feeder and the second feeder comprise a coaxial cable, a microstrip, or a balun transmission line.

5. The antenna according to claim 1, wherein the antenna comprises a dielectric layer, and the dielectric layer comprises a first surface and a second surface that are disposed facing away from each other; and the first radiation arm, the second radiation arm, the third radiation arm, the fourth radiation arm, the first wire, and the second wire are all located on the first surface.

6. The antenna according to claim 5, wherein the third wire comprises a first part, a second part, a third part, a fourth part, and a fifth part that are connected in sequence, an end of the first part away from the second part is the first end of the third wire, an end of the fifth part away from the fourth part is the second end of the third wire, both the first part and the fifth part are located on the first surface, both the second part and the fourth part are located between the first surface and the second surface, and the third part is located on the second surface; and the second feeder is located on a side of the second surface away from the first surface, and the feed end of the second feeder or the ground end of the second feeder is electrically connected to the third part.

7. The antenna according to claim 5, wherein the dielectric layer is provided with a through hole, the through hole passes through the first surface and the second surface, the feed end of the first feeder and the ground end of the first feeder extend into the through hole from the side of the second surface away from the first surface, one of the feed end of the first feeder and the ground end of the first feeder is electrically connected to the first wire, and the other is electrically connected to the second wire.

8. The antenna according to claim 5, wherein the first radiation arm is an integrally formed mechanical part.

9. The antenna according to claim 8, wherein the first wire is located on the first surface, and the first radiation section and the first wire are integrally formed mechanical parts.

10. The antenna according to claim 1, wherein the antenna comprises a dielectric layer, and the dielectric layer comprises a first surface and a second surface that are disposed facing away from each other;

the first radiation arm comprises a first radiation section and a second radiation section, the first radiation section comprises a first end and a second end, the second radiation section comprises a first end and a second end, the first end of the first radiation section is the first end of the first radiation arm, and the second end of the second radiation section is the second end of the first radiation arm; and the first radiation section is located on the first surface, the second radiation section is located on the second surface, and the second end of the first radiation section is coupled to the first end of the second radiation section.

11. The antenna according to claim 1, wherein the first radiation arm, the second radiation arm, the third radiation arm, and the fourth radiation arm are of a centrosymmetric structure.

12. The antenna according to claim 1, wherein the antenna comprises a reflection panel, and the first transmission line, the second transmission line, and the radiator are all located on a side of the reflection panel.

13. The antenna according to claim 1, wherein the antenna comprises a radome, and the feeding network, the first transmission line, the second transmission line, and the radiator are all located inside the radome.

14. A base station, comprising:

a radio frequency processing unit and an antenna, wherein the radio frequency processing unit is electrically connected to the antenna, the antenna comprises a feeding network, a first transmission line, a second transmission line, and a radiator, wherein the first transmission line is spaced apart from and crosses the second transmission line, the first transmission line comprises a first wire and a second wire that are spaced apart and disposed in parallel, and the second transmission line comprises a third wire and a fourth wire that are spaced apart and disposed in parallel;

the radiator comprises a first radiation arm, a second radiation arm, a third radiation arm, and a fourth radiation arm, a first end of the first radiation arm is electrically connected to a first end of the first wire, a second end of the first radiation arm is electrically connected to a first end of the third wire, a first end of the second radiation arm is electrically connected to a second end of the first wire, a second end of the second radiation arm is electrically connected to a first end of the fourth wire, a first end of the third radiation arm is electrically connected to a first end of the second wire, a second end of the third radiation arm is electrically connected to a second end of the third wire, a first end of the fourth radiation arm is electrically connected to a second end of the second wire, and a second end of the fourth radiation arm is electrically connected to a second end of the fourth wire; and the feeding network comprises a first feeder and a second feeder, one of a feed end of the first feeder and a ground end of the first feeder is electrically connected to the first wire, the other is electrically connected to the second wire, one of a feed end of the second feeder and a ground end of the second feeder is electrically connected to the third wire, and the other is electrically connected to the fourth wire.

15. The base station according to claim 14, wherein an angle between the first radiation arm and the first wire toward the second radiation arm is a first angle a1, and $0° < a1 \leq 90°$.

16. The base station according to claim 14, wherein one of the feed end of the first feeder and the ground end of the first feeder is electrically connected to a middle part of the first wire, and the other is electrically connected to a middle part of the second wire.

17. The base station according to claim 14, wherein both the first feeder and the second feeder comprise a coaxial cable, a microstrip, or a balun transmission line.

18. The base station according to claim 14, wherein the antenna comprises a dielectric layer, and the dielectric layer comprises a first surface and a second surface that are disposed facing away from each other; and the first radiation arm, the second radiation arm, the third radiation arm, the fourth radiation arm, the first wire, and the second wire are all located on the first surface.

19. The base station according to claim 18, wherein the third wire comprises a first part, a second part, a third part, a fourth part, and a fifth part that are connected in sequence, an end of the first part away from the second part is the first end of the third wire, an end of the fifth part away from the fourth part is the second end of the third wire, both the first part and the fifth part are located on the first surface, both the second part and the fourth part are located between the first surface and the second surface, and the third part is located on the second surface; and the second feeder is located on a side of the second surface away from the first surface, and the feed end of the second feeder or the ground end of the second feeder is electrically connected to the third part.

20. The base station according to claim 18, wherein the dielectric layer is provided with a through hole, the through hole passes through the first surface and the second surface, the feed end of the first feeder and the ground end of the first feeder extend into the through hole from the side of the second surface away from the first surface, one of the feed end of the first feeder and the ground end of the first feeder is electrically connected to the first wire, and the other is electrically connected to the second wire.

* * * * *